US009402087B2

(12) United States Patent
Kimata et al.

(10) Patent No.: US 9,402,087 B2
(45) Date of Patent: Jul. 26, 2016

(54) PICTURE ENCODING METHOD, PICTURE DECODING METHOD, PICTURE ENCODING APPARATUS, PICTURE DECODING APPARATUS, PICTURE ENCODING PROGRAM, AND PICTURE DECODING PROGRAM

(75) Inventors: Hideaki Kimata, Yokohama (JP); Masaki Kitahara, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1907 days.

(21) Appl. No.: 10/590,135

(22) PCT Filed: Aug. 16, 2005

(86) PCT No.: PCT/JP2005/014945
§ 371 (c)(1),
(2), (4) Date: Aug. 17, 2006

(87) PCT Pub. No.: WO2006/019093
PCT Pub. Date: Feb. 23, 2006

(65) Prior Publication Data
US 2007/0183499 A1    Aug. 9, 2007

(30) Foreign Application Priority Data
Aug. 16, 2004 (JP) .................. 2004-236520

(51) Int. Cl.
*H04N 19/513* (2014.01)
*H04N 19/615* (2014.01)
(Continued)

(52) U.S. Cl.
CPC ........... *H04N 19/615* (2014.11); *H04N 19/176* (2014.11); *H04N 19/196* (2014.11);
(Continued)

(58) Field of Classification Search
CPC . H04N 7/0157; H04N 19/196; H04N 19/513; H04N 19/52

USPC ........................................ 375/240.12, 240.16
See application file for complete search history.

(56) References Cited

U.S. PATENT DOCUMENTS 5,701,164 A * 12/1997 Kato .............................. 348/699
6,043,838 A *  3/2000 Chen .............................. 348/42
(Continued)

FOREIGN PATENT DOCUMENTS

EA          1422946 A1    5/2004
EP       0 691 789 A2    1/1996
(Continued)

OTHER PUBLICATIONS

Wiegand, Thomas, Zhang, Xiaozheng and Girod, Bernd, "Long-Term Memory Motion-Compensated Prediction," IEEE Transactions on Circuits and Systems for Video Technology, vol. 9, No. 1, pp. 70-84, Feb. 1999.
(Continued)

*Primary Examiner* — Farzana Hossain
*Assistant Examiner* — Christopher Findley
(74) *Attorney, Agent, or Firm* — Harness, Dickey & Pierce, P.L.C.

(57) ABSTRACT

In picture encoding that generates prediction pictures from picture information of frames previously encoded and encodes picture information for each area, the encoding efficiency is improved. A plurality of motion vector candidates are stored in advance in a motion vector storage memory (107). A motion vector selection section (109) selects a motion vector to be used from the plurality of motion vectors stored in advance in the motion vector storage memory (107). A prediction picture generation section (104) generates a prediction picture from a reference picture using the selected motion vector. A differential encoding section (103) encodes a differential between the picture information of the present area and the prediction picture. A motion vector designation encoding section (110) encodes information that designates the motion vector selected by the motion vector selection section (109).

12 Claims, 34 Drawing Sheets

(51) Int. Cl.
*H04N 19/597* (2014.01)
*H04N 19/56* (2014.01)
*H04N 19/52* (2014.01)
*H04N 19/176* (2014.01)
*H04N 19/51* (2014.01)
*H04N 19/196* (2014.01)
*H04N 19/63* (2014.01)
*H04N 19/61* (2014.01)
*H04N 19/463* (2014.01)
*H04N 19/42* (2014.01)
*H04N 19/31* (2014.01)
*H04N 19/523* (2014.01)
*H04N 19/517* (2014.01)
*H04N 19/59* (2014.01)
*H04N 19/577* (2014.01)
*H04N 19/13* (2014.01)

(52) U.S. Cl.
CPC .............. *H04N 19/31* (2014.11); *H04N 19/42* (2014.11); *H04N 19/463* (2014.11); *H04N 19/51* (2014.11); *H04N 19/513* (2014.11); *H04N 19/517* (2014.11); *H04N 19/52* (2014.11); *H04N 19/523* (2014.11); *H04N 19/56* (2014.11); *H04N 19/577* (2014.11); *H04N 19/59* (2014.11); *H04N 19/597* (2014.11); *H04N 19/61* (2014.11); *H04N 19/63* (2014.11); *H04N 19/13* (2014.11)

(56) References Cited

U.S. PATENT DOCUMENTS

| | | | |
|---|---|---|---|
| 6,233,356 B1 * | 5/2001 | Haskell et al. | 382/243 |
| 6,519,287 B1 | 2/2003 | Hawkins et al. | |
| 7,310,373 B2 * | 12/2007 | Kondo et al. | 375/240.16 |
| 7,463,683 B2 * | 12/2008 | Van Der Schaar et al. | 375/240.1 |
| 2001/0031004 A1 | 10/2001 | Kim et al. | |
| 2003/0174776 A1 | 9/2003 | Shimizu et al. | |
| 2004/0136461 A1 | 7/2004 | Kondo et al. | |
| 2004/0234143 A1 | 11/2004 | Hagai et al. | |
| 2004/0264570 A1 | 12/2004 | Kondo et al. | |

FOREIGN PATENT DOCUMENTS

| | | |
|---|---|---|
| EP | 1411729 A1 | 4/2004 |
| EP | 1427216 A1 | 6/2004 |
| JP | 2004-88737 A | 3/2004 |
| JP | 2004-194274 A | 7/2004 |
| JP | 2004-208258 A | 7/2004 |
| WO | 03/036981 A1 | 5/2003 |
| WO | WO-03/090473 A1 | 10/2003 |
| WO | WO-2004/006586 A1 | 1/2004 |
| WO | WO-2004/012459 A1 | 2/2004 |

OTHER PUBLICATIONS

Tourapis, Alexis Michael, "Direct Prediction for Predictive (P) and Bidirectionally Predictive (B) Frames in Video Coding," JVT-C128, Joint Video Team (JVT) of ISO/IEC MPEG & ITU-T VCEG Meeting, May 2002.

Ohm, Jens-Rainer, "Three-Dimensional Subband Coding with Motion Compensation," IEEE Transactions on Image Processing, vol. 3, No. 5, pp. 559-571, 1994.

* cited by examiner

PICTURE ENCODING METHOD, PICTURE DECODING METHOD, PICTURE ENCODING APPARATUS, PICTURE DECODING APPARATUS, PICTURE ENCODING PROGRAM, AND PICTURE DECODING PROGRAM

TECHNICAL FIELD

The present invention relates to technology for multi-frame picture encoding using an inter-frame prediction encoding scheme.

Priority is claimed on Japanese Patent Application No. 2004-236520, filed Aug. 16, 2004, the content of which is incorporated herein by reference.

BACKGROUND ART

International standards for moving picture encoding such as MPEG-1, MPEG-2, H.261 and H.263 encode the output time of each frame. This temporal information is called the temporal reference (TR), which is fixed-length encoded on a frame-by-frame basis. The time interval serving as the reference in the system is set in advance, indicating the time from the start of the sequence by the product of the time interval and the TR. In the encoder, each frame is encoded by setting the temporal information of the input picture in the TR, and in the decoder, the decoded picture of each frame is output at the time designated by the TR.

Meanwhile, inter-frame prediction encoding is generally employed in order to achieve a high encoding efficiency using the correlation in the temporal domain in moving picture encoding. Frame encoding modes include I-frame encoding which does not use inter-frame correlation, P-frame encoding which uses one previously encoded frame to predict a future frame, and B-frame encoding that can perform frame prediction from two previously encoded frames.

In B-frame encoding, it is therefore necessary to store a decoded picture of two frames in a reference picture memory. In particular, the video encoding schemes H.263 and H.264 can predict frames by storing a decoded picture of two or more frames in the reference picture memory, and selecting the reference picture from the memory. The reference picture can be selected for each block, and reference picture designation information that designates the reference picture is encoded. The reference picture memory includes short-term reference memory (STRM) and long-term reference memory (LTRM). STRM stores the decoded picture of the current frame, while LTRM selects and stores the picture stored in STRM. For example, Non-patent Document 1 given below can be cited as a document that discloses a control method of LTRM and STRM.

In the B-frame encoding of MPEG-1 and MPEG-2, a method that predicts from past frames is called forward inter-frame prediction, and a method that predicts from future frames is called backward inter-frame prediction. The display time of the reference frame in backward inter-frame prediction is further in the future than the present frame. In this case, after the display of the current frame, the reference frame of backward inter-frame prediction is output. In the case of predicting from two frames in B-frame encoding (bidirectional inter-frame prediction), the picture information of two frames is interpolated to create the picture information of one frame, which serves as the prediction picture.

FIG. 1 shows an example of the predictive relation of a moving picture in the case of the display time of the reference frame in backward inter-frame prediction being in the future.

When performing encoding with the encoding modes of the first through seventh frames in the order of IBBPBBP, the predictive relation shown in the upper side of FIG. 1 (IBBPBBP) exists. Therefore, when actually encoding, the frames are encoded in the order of 1423756 as shown in the lower side of FIG. 1. The order of the TR encoded in this case becomes a value corresponding to 1423756, similarly to the encoded frames.

The concept of backward inter-frame prediction in B-frame encoding of the H.264 expands on that of MPEG-1 and MPEG-2, in that the display time of the reference frame in backward inter-frame prediction may be further in the past than the present frame. In this case, the reference frame in backward inter-frame prediction is output first. Although noted above, in the H.264, a plurality of decoded pictures can be stored in the reference picture memory. Therefore the reference picture designation information L0 for forward inter-frame prediction and the reference picture designation information L1 for backward inter-frame prediction are defined to independently designate the reference picture for forward inter-frame prediction and the reference picture for backward inter-frame prediction.

To designate the reference picture for each block, first the block prediction mode (forward inter-frame prediction, backward inter-frame prediction, or bidirectional inter-frame prediction) is encoded. When the prediction mode is forward inter-frame prediction the reference picture designation information L0 is encoded. When the prediction mode is backward inter-frame prediction the reference picture designation information L1 is encoded. When the prediction mode is bidirectional inter-frame prediction the reference picture designation information L0 and the reference picture designation information L1 are encoded.

When the definition is given in this way, there is no need for the display time of the reference frame in backward inter-frame prediction to be in the future of the present frame. In the B-frame encoding of the H.264, backward inter-frame prediction can thus designate a past frame as a reference picture, and moreover since the designation can be changed on a block by block basis, except for bidirectional inter-frame prediction, a prediction image identical to P-frame encoding can be created.

FIG. 2 shows an example of the predictive relation of a moving picture in the case of the display time of the reference frame in backward inter-frame prediction being in the past. Unlike the case of FIG. 1, even when encoding is performed with the encoding modes of the first frame through the seventh frame in the order of IBBPBBP, since there is the predictive relation (IBBPBBP) shown on the upper side of FIG. 2, the frames are encoded in the order of 1423567 as shown in the lower side of FIG. 2.

As a method of B-frame motion vector encoding, the temporal direct mode scheme has been proposed. This technique is adopted in the H.264 international standard. This is a method of storing the latest P-frame motion vector in an encoded order and scaling the motion vector information by a time interval to compute the motion vector.

Regarding frames a, b, and c shown in FIG. 3, they are encoded in the order of frame a, frame b, and frame c, with the frame a and the frame c being P-frame encoded, and the frame b being B-frame encoded. When the motion vector of the same position block of the P-frame is mv, the forward prediction motion vector fmv and the backward prediction motion vector bmv of the current block of the B frame encoding are computed by Equation 1.

$$fmv = (mv \times TRab)/TRac$$

$$bmv = (mv \times TRbc)/TRac \qquad (1)$$

TRab, TRbc, and TRac, respectively, indicate the time interval between the frame a and the frame b, the time interval between the frame b and the frame c, and the time interval between the frame a and the frame c. As technology that applies this, Non-patent Document 2 below proposes a method of storing the latest P-frame motion vector in the encoding order to be used as the current P-frame motion vector. According to such schemes, when there is continuity of motion between a plurality of frames to be continuously encoded, the motion vector can be efficiently encoded.

By having a constitution that does not store such B-frame decoded images in the reference picture memory, even if the B-frame is not decoded, the next frame can be decoded. Thereby the frame rate can be lowered by not decoding the B frame, and a temporal-scalable function can be achieved.

Also, in the H.264, as shown in FIG. 4, the macroblock is divided into two or four parts, and when divided into four parts, a tree structure can be constituted that can further divide a region of 8 vertical and horizontal pixels into two or four parts. It is possible for each divided region to have a different motion vector. The reference picture can be selected in units of two or four divisions of the macroblock. This type of macroblock partition pattern is encoded as encoded mode information.

Also, as a scheme of realizing temporal scalable encoding, there is motion compensated temporal filtering (MCTF). This MCTF encoding method is a scheme that performs filtering (sub-band partitioning) in the time domain with respect to the video data and uses the correlation in the time domain of the video data to make the video data energy compact.

FIG. 5 is a conceptual diagram of octave partitioning of the low band region in the time domain. A group of pictures (GOP) is set and filtering is performed in the time domain within the GOP. When applying a filter in the time domain, motion compensation may be performed. In the filter of the time domain the Haar basis is generally proposed (refer to Non-patent Document 3).

Generally in the Haar basis, the lifting scheme can be applied as shown in FIGS. 6A and 6B. By this scheme, filtering can be performed with a small amount of computation. In this lifting scheme, "predict" is a process identical to normal prediction encoding, being a process to determine the residual of the prediction picture and the original picture.

Non-patent Document 1: Thomas Wiegand, Xiaozheng Zhang, Bernd Girod, "Long-Term Memory Motion-Compensated Prediction," IEEE Transactions on Circuits and Systems for Video Technology, Vol. 9, No. 1, pp. 70-84, February 1999.

Non-patent Document 2: Alexis Michael Tourapis, "Direct Prediction for Predictive (P) and Bidirectionally Predictive (B) Frames in Video Coding," JVT-C128, Joint Video Team (JVT) of ISO/IEC MPEG&ITU-T VCEG Meeting, May 2002.

Non-patent Document 3: Jens-Rainer Ohm, "Three-Dimensional Subband Coding with Motion Compensation," IEEE Trans. Image Proc., Vol. 3, No. 5, pp. 559-571, 1994.

DISCLOSURE OF THE INVENTION

Problems to be Solved by the Invention

In the conventional direct mode, the motion vector of the frame just encoded is stored, and the motion vector is computed by scaling the motion vector by a time interval. As a result, when there is no continuity of motion between frames, an efficient motion vector cannot be computed.

The present invention solves the aforementioned problem, and has as its object to improve the encoding efficiency in picture encoding by selecting a motion vector from motion vector candidates stored in advance.

Means for Solving the Problem

In order to solve the aforementioned problem, the first invention is a picture encoding method that encodes picture information for each area by generating prediction pictures from picture information of frames that have been previously encoded, the method comprising: a motion vector selection step that selects a motion vector from a plurality of motion vectors that have been stored in advance; a prediction picture generation step that generates a prediction picture from a reference picture using the motion vector selected by the motion vector selection step; and a differential encoding step that encodes a difference between the picture information of the present area and the prediction picture.

The second invention is a picture encoding method in accordance with the first invention, wherein the motion vector selection step selects the motion vector from the plurality of motion vectors in accordance with position information of areas within a screen.

The third invention is a picture encoding method in accordance with the first or second inventions that further comprises a motion vector designation encoding step that encodes information that designates the motion vector selected by the motion vector selection step.

The fourth invention is a picture encoding method that encodes picture information for each area by selecting a reference picture from picture information of a plurality of frames that have been previously encoded and generating a prediction picture, the method comprising: a reference motion vector setting step that sets a correspondence relation between a plurality of motion vectors that have been stored in advance and reference picture designation information that designates a reference picture; a reference picture selection step that selects the reference picture; a reference picture designation encoding step that encodes the reference picture designation information that designates the reference picture; a motion vector selection step that selects a motion vector corresponding to the reference picture designation information from the plurality of motion vectors that have been stored in advance; a prediction picture generation step that generates a prediction picture from the reference picture using the motion vector selected by the motion vector selection step; and a differential encoding step that encodes a difference between the picture information of the present area and the prediction picture.

The fifth invention is a picture encoding method in accordance with the first, third or fourth inventions that further comprises: a motion detection step that detects a motion vector using the picture information of the present area and the reference picture; a detected motion vector selection step that selects either of the motion vector selected by the motion vector selection step or the motion vector obtained in the motion detection step; a detected motion vector encoding step that, when the motion vector obtained in the motion detection step is selected by the detected motion vector selection step, encodes the motion vector; and a detected motion vector designation encoding step that encodes information designating the motion vector selected by the detected motion vector selection step.

The sixth invention is a picture encoding method in accordance with the first, third or fourth inventions that further comprises: a motion detection step that detects a motion vector using the picture information of the present area and the reference picture; and a differential motion vector encoding step that encodes the difference between the motion vector selected by the motion vector selection step and the motion vector obtained in the motion detection step.

The seventh invention is a picture encoding method in accordance with the fifth or sixth inventions that further comprises: a motion vector storage step that stores motion vectors; a motion vector storage decision step that decides whether or not to store a motion vector; and a motion vector storage designation encoding step that encodes information that designates whether or not to store a motion vector.

The eighth invention is a picture encoding method in accordance with the fifth or sixth inventions that further comprises: a motion vector storage step that stores motion vectors; and a motion vector scaling step that changes the value of the motion vector using motion vector scaling information.

The ninth invention is a picture encoding method in accordance with the eighth invention that further comprises a scaling encoding step that encodes the motion vector scaling information.

The tenth invention is a picture decoding method that decodes picture information for each area by generating prediction pictures from picture information of frames that have been previously decoded, the method comprising: a motion vector selection step that selects a motion vector from a plurality of motion vectors that have been stored in advance; a prediction picture generation step that generates a prediction picture from a reference picture using the motion vector selected by the motion vector selection step; and a decoded picture generation step that generates a decoded picture by decoding a difference between the picture information of the present area and the prediction picture.

The eleventh invention is a picture decoding method in accordance with the tenth invention, wherein the motion vector selection step selects the motion vector from the plurality of motion vectors in accordance with position information of areas within a screen.

The twelfth invention is a picture decoding method in accordance with the tenth or eleventh inventions that further comprises a motion vector designation decoding step that decodes information that designates the motion vector selected by the motion vector selection step.

The thirteenth invention is a picture decoding method that decodes picture information for each area by selecting a reference picture from picture information of a plurality of frames that have been previously decoded and generating a prediction picture, the method comprising: a reference motion vector setting step that sets a correspondence relation between a plurality of motion vectors that have been stored in advance and reference picture designation information that designates a reference picture; a reference picture designation decoding step that decodes the reference picture designation information that designates the reference picture; a reference picture selection step that selects the reference picture; a motion vector selection step that selects a motion vector corresponding to the reference picture designation information from the plurality of motion vectors that have been stored in advance; a prediction picture generation step that generates a prediction picture from the reference picture using the motion vector selected by the motion vector selection step; and a decoded picture generation step that generates a decoded picture by decoding a difference between the picture information of the present area and the prediction picture.

The fourteenth invention is a picture decoding method in accordance with the tenth, twelfth, or thirteenth inventions that further comprises: a detected motion vector designation decoding step that decodes information that designates whether or not the motion vector is encoded; and a detected motion vector decoding step that decodes the motion vector in the case that the motion vector is encoded.

The fifteenth invention is a picture decoding method in accordance with the tenth, twelfth, or thirteenth inventions that further comprises: a differential motion vector decoding step that decodes a differential motion vector; and a differential motion vector computation step that computes the motion vector from the differential motion vector and the motion vector selected by the motion vector selection step.

The sixteenth invention is a picture decoding method in accordance with the fourteenth or 15th inventions that further comprises: a motion vector storage step that stores motion vectors; and a motion vector storage designation decoding step that decodes information that designates whether or not to store a motion vector.

The seventeenth invention is a picture decoding method in accordance with the fourteenth or fifteenth inventions that further comprises: a motion vector storage step that stores motion vectors; and a motion vector scaling step that changes the value of the motion vector using motion vector scaling information.

The eighteenth invention is a picture decoding method in accordance with the seventeenth invention that further comprises a scaling decoding step that decodes the motion vector scaling information.

The picture encoding method according to the first invention or the picture decoding method according to the tenth invention can generate a prediction picture by selecting a motion vector to be used from a plurality of motion vectors stored in advance. In the conventional direct mode, since the motion vector of a frame previously encoded is stored for one frame, and the prediction picture is then generated by using the motion vector of the area at the same position within the screen, selection of the motion vector could not be performed. Since the present invention can select the motion vector from motion vector candidates, the encoding efficiency can be improved. Also, according to the present method, even when there is no continuity of motion between successive frames, since the motion vector can be selected from a plurality of motion vector candidates, an efficient motion vector can be selected.

The motion vector may be stored in advance before encoding the frame to be encoded, or may be stored in advance before encoding the area to be encoded. For example, in the case of encoding moving pictures shot with a camera moving at a constant speed, the moving distance of the picture content between frames is measured in advance and may be stored as a motion vector. Also, in the case of shooting with a plurality of cameras, the spatial distance between the cameras is measured and may be stored as a motion vector. Thus, in the case of measurable motion amounts being obtained in advance, the motion amounts may be stored as motion vectors. Then a plurality of such motion vector candidates are stored and selected for respective areas.

For example, a position of an area within the screen may be used as a reference for selecting one motion vector from a plurality of motion vector stored in advance. This can be achieved by the picture encoding method according to the second invention or the picture decoding method according to the eleventh invention. For example, when computing motion vectors from camera motion information, the motion vectors may differ at the upper side and the lower side of the screen. In such a case, by computing the motion vectors at the upper side and lower side of the screen in advance and storing in the memory, when encoding each area, selecting one motion vector from a plurality of motion vectors using the position information of the areas can enable efficient encoding. Also, in the case of scalable encoding, layer information belonging to the frames to be encoded may be utilized as a reference for selecting motion vectors.

For example, in the case of performing temporal scalable encoding using the base layer and the enhancement layers as shown in FIG. 7, memory is prepared that stores the motion vectors corresponding to each layer. When encoding each frame, the motion vectors stored in the memory for the layers belonging to that frame may then be selected. This method is similar even in MCTF encoding shown in FIG. 5, in that the motion vector memory corresponding to each layer is prepared, and the motion vector may be selected using the layer information.

Also, this kind of motion vector information may be encoded for each frame or plurality of areas. This motion vector information is then decoded and stored on the picture decoding side.

The picture encoding method according to the third invention or the picture decoding method according to the twelfth invention can select a motion vector with good encoding efficiency on the picture encoding side by encoding information that designates a motion vector selected from a plurality of motion vectors.

Also, in ordinary motion vector encoding, two symbols are encoded in order to independently encode the vertical and horizontal components. When selecting one motion vector from a plurality of motion vectors, in order to encode information that designates the motion vector, only one symbol is encoded, and so the encoding efficiency improves.

According to the picture encoding method according to the fourth invention or the picture decoding method according to the thirteenth invention, when encoding by selecting a reference picture from a plurality of frames, using information that designates the reference picture the motion vector can be simultaneously designated, and so the amount of encoding of information designating motion vectors can be reduced. The motion vectors stored in advance are classified into a plurality of categories, and each category corresponds to each reference picture. Therefore, the category of one motion vector is associated with the information which specifies a reference picture. Among the motion vectors belonging to this category, similarly to the conventional direct mode, the motion vector of the same position within the frame is selected. In addition, the reference motion vector setting step may be performed once for every frame or plurality of areas, without the necessity of being performed in every area.

The correspondence relation between the reference picture designation information that designates the reference picture and the reference picture allows multiple settings. For example, for B frame, the correspondence relation for the forward prediction and the correspondence relation for backward prediction can be separately set. In this case, the reference motion vector setting step is executed twice, for forward prediction and backward prediction.

According to the picture encoding method according to the fifth invention or the picture decoding method according to the fourteenth invention, motion detection is performed to determine a motion vector, and one motion vector is selected for encoding from among this motion vector and motion vectors stored in advance. Thereby, even in areas where the encoding efficiency is poor with the motion vectors stored in advance, the encoding efficiency can be improved. In the detected motion vector designation encoding step, information is encoded for designating whether to use the detected motion vector or to use the motion vector stored in advance. This may be separately encoded or may be encoded in combination with the encoding mode. The encoding mode includes information such as whether to intra-encode an area, whether to re-divide an area, and the direction of prediction in the case of B-frame. As one of the encoding modes, whether to use a motion vector stored in advance may be indicated. Also, in the motion vector designation encoding step, when encoding information that designates the motion vector to be selected from the motion vectors stored in advance, the information designating whether or not to select a motion vector obtained in the motion detection may be combined with this information. For example, when two motion vectors are stored in advance, by applying the numerical values 0 and 1 as information that designates the motion vectors to be selected from them respectively, the motion vector obtained in the motion detection may be designated as the numerical value 2.

In the picture encoding method according to the sixth invention or the picture decoding method according to the fifteenth invention, motion detection is performed to determine the motion vector, and by encoding the difference between this motion vector and motion vectors stored in advance, when the encoding efficiency is poor with the motion vectors stored in advance, an efficient motion vector can be set.

In the picture encoding method according to the seventh invention or the picture decoding method according to the sixteenth invention, motion vectors determined by motion detection can be stored. Thereby, the motion vectors stored in advance can be updated. An acceptable method of updating the motion vectors is to for example discard the oldest stored motion vector and store a new motion vector. Also, in the case of simultaneously designating the motion vector using information that designates the reference picture as in the picture encoding method according to the fourth invention or the picture decoding method according to the thirteenth invention, the motion vector at the same position in the selected reference picture may be discarded and a new motion vector stored. Moreover, a judgment can be made whether or not to store a motion vector determined by performing motion detection. Since the stored motion vector is to be used from the next frame onward, by storing only motion vectors that can improve the encoding efficiency from the next frame onward, the amount of memory used for storing motion vectors can be reduced.

In the case of storing motion vectors determined by performing motion detection according to the picture encoding method of the eighth invention or the picture decoding method of the seventeenth invention, in the case of storing motion vectors obtained in the motion detection, storage can be performed after changing the value using the motion vector scaling information. For example, a motion vector is determined to an accuracy of a quarter pixel in the motion detection, and may be changed to a motion vector with integer pixel accuracy during storage. At this time, motion vector information of an accuracy below integer pixel accuracy is lost, but the numerical value expressing the motion vector can be reduced. Thereby, the amount of memory used for storing motion vectors can be reduced.

By encoding motion vector scaling information according to the picture encoding method of the ninth invention or the picture decoding method of the eighteenth invention, it is possible to change the accuracy of the motion vector being stored per frame or area. Thereby, the amount of memory that stores motion vectors can be more suitably reduced. For example, in areas with fine textures a motion vector with a fine accuracy of a quarter pixel can be stored, and in areas with no textures, a motion vector with a coarse accuracy such as an integer pixel may be stored.

In the differential encoding step of the present invention, the difference information may be lossless encoded or lossy encoded.

Effect of the Invention

According to the present invention, a prediction picture can be generated by selecting a motion vector to be used from a plurality of motion vectors stored in advance. In the conventional direct mode, since the motion vector of a frame previously encoded is stored for one frame, and the prediction picture is then generated by using the motion vector of the area at the same position within the screen, selection of the motion vector could not be performed. Since the present invention can select the motion vector from motion vector candidates, the encoding efficiency can be improved. Also, according to the present method, even when there is no continuity of motion between successive frames, since the motion vector can be selected from a plurality of motion vector candidates, an efficient motion vector can be selected.

Figure 1:
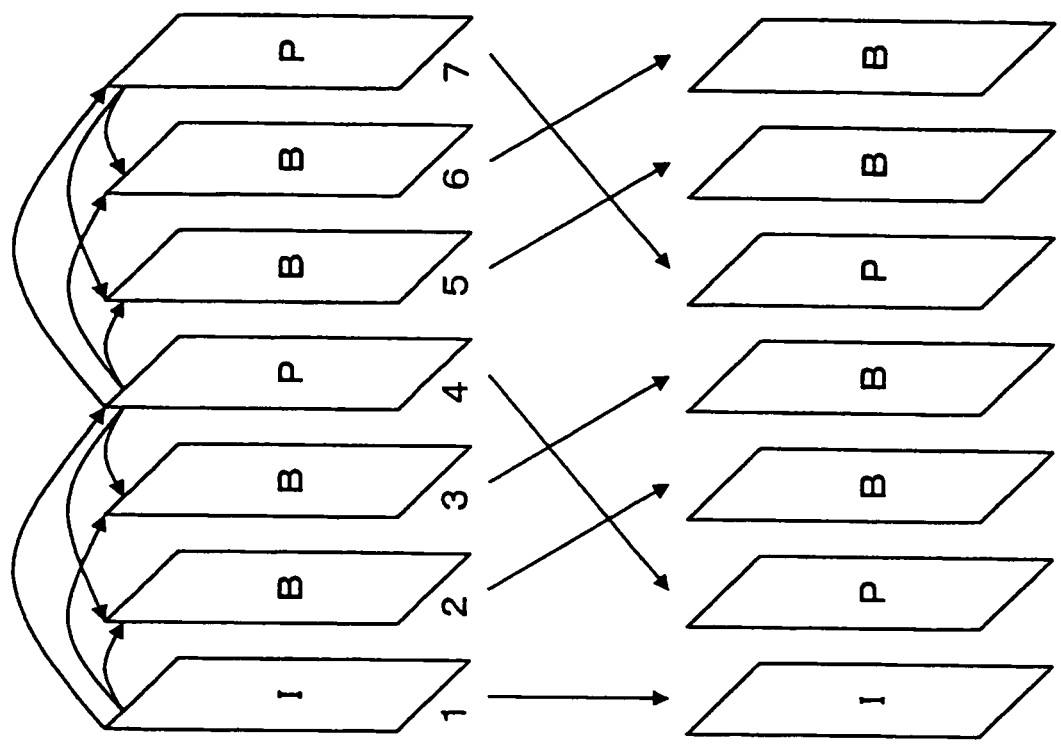
FIG. 1 is a drawing showing Example 1 of the predictive relation, with the upper side showing the predictive relation of IBBPBBP, and the lower side showing the encoding order.
Figure 2:
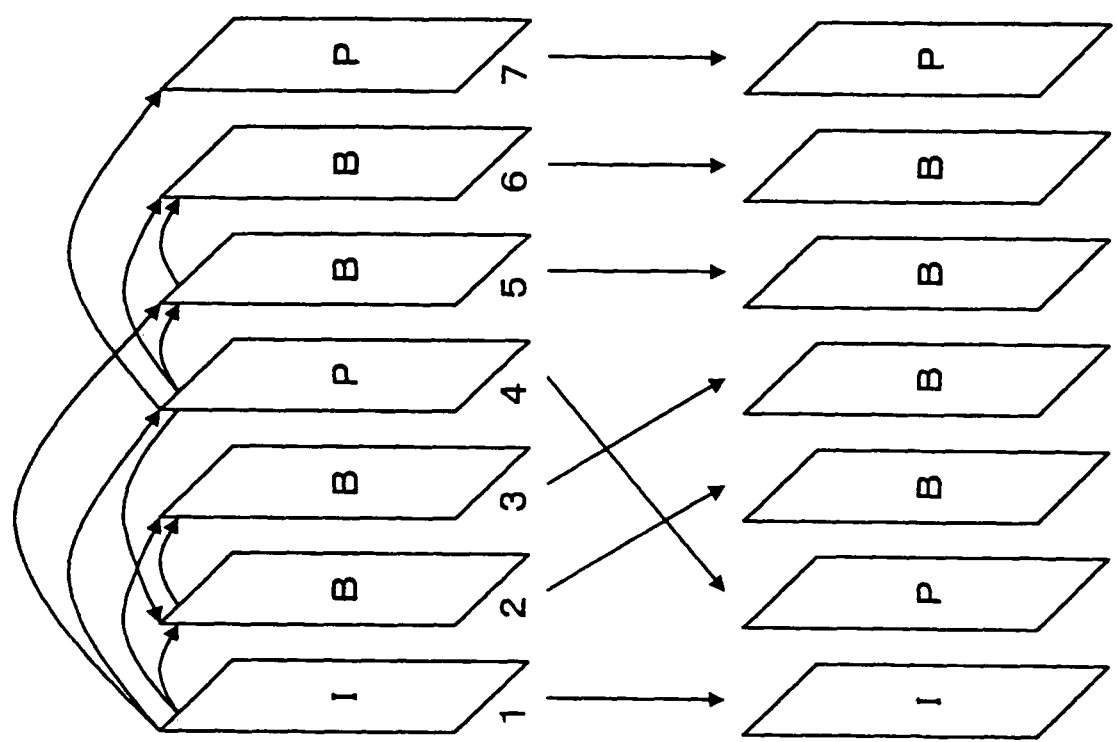
FIG. 2 is a drawing showing Example 2 of the predictive relation, with the upper side showing the predictive relation of IBBPBBP, and the lower side showing the encoding order.
Figure 3:
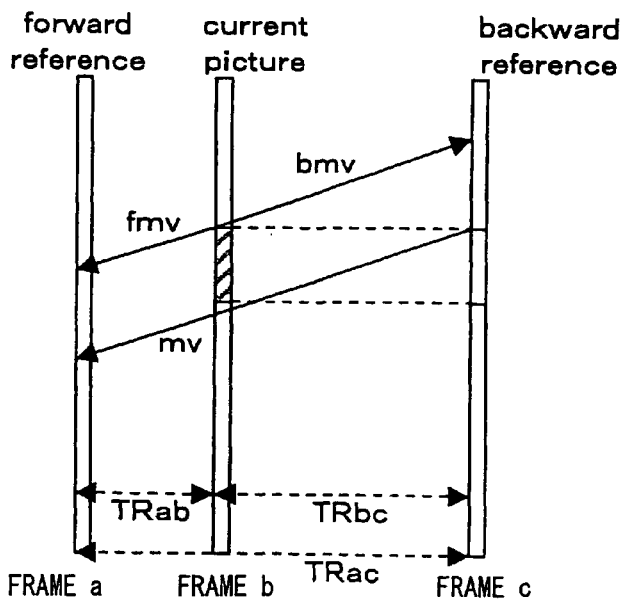
FIG. 3 is drawing showing a motion vector in the direct mode.
Figure 4:
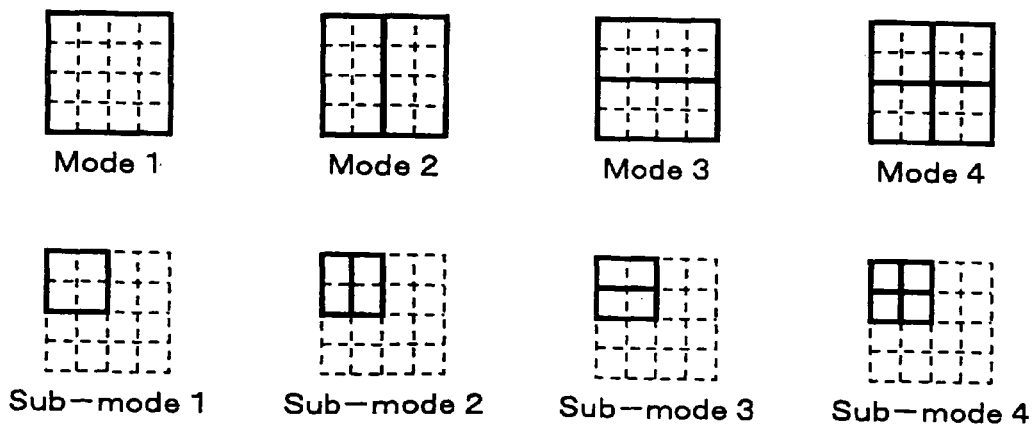
FIG. 4 is a schematic diagram of block division in the H.264.
Figure 5:
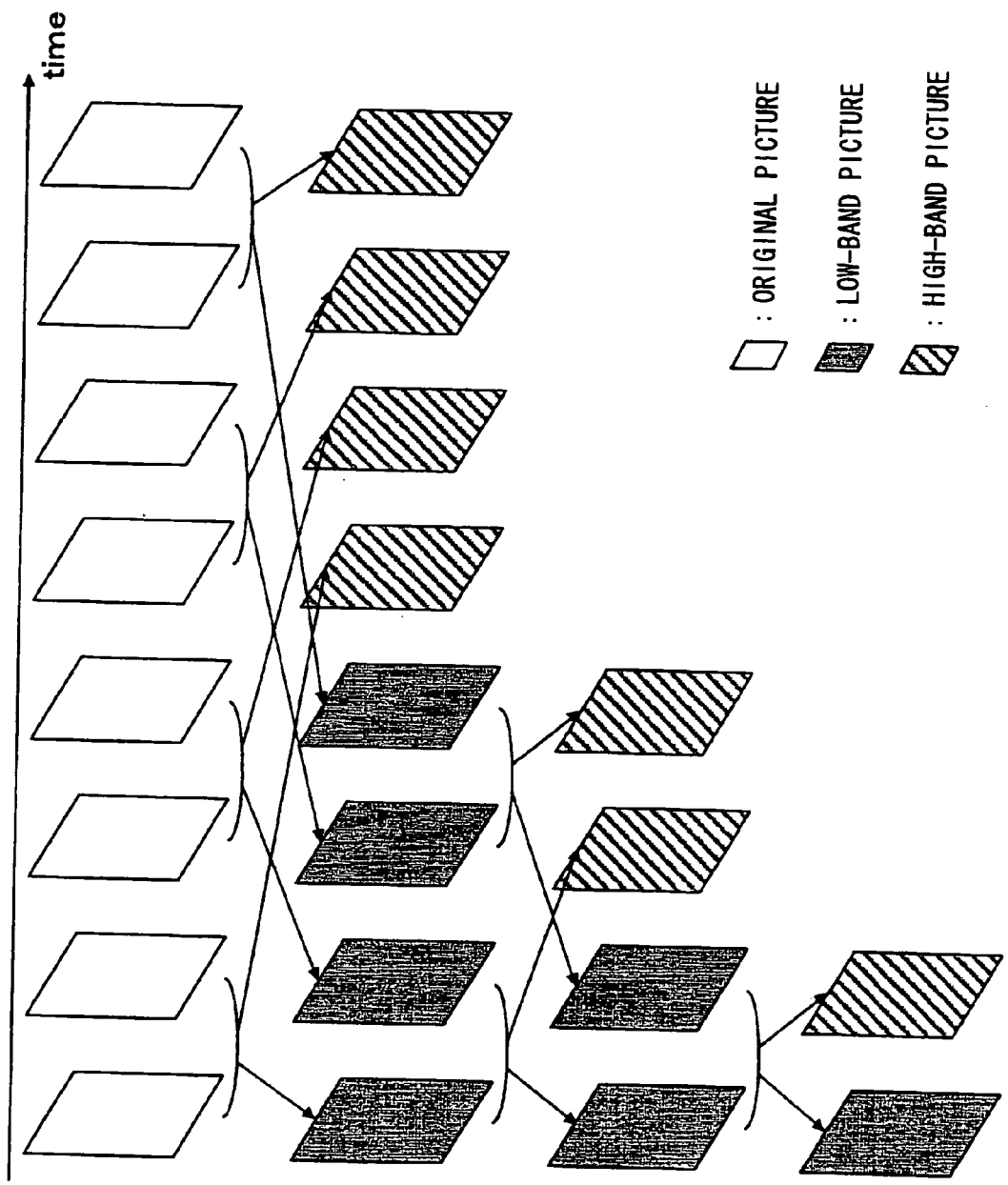
FIG. 5 is a drawing explaining a time-domain filter in MCTF encoding.
Figure 6A:
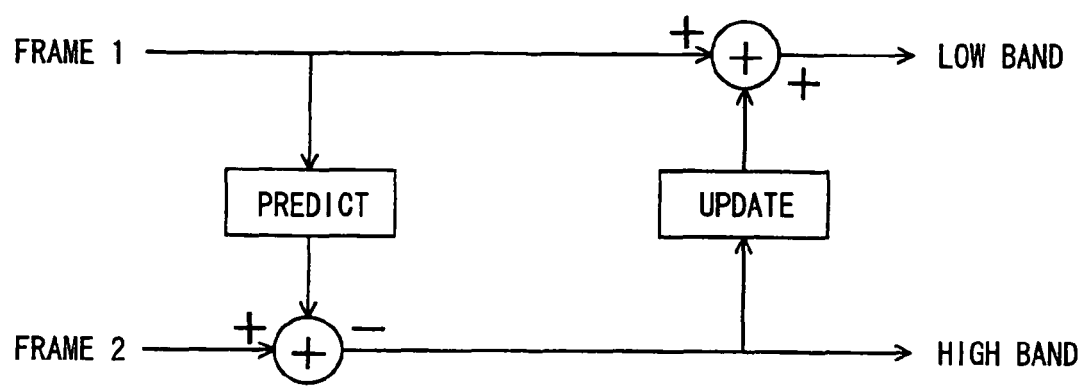
FIG. 6A is a drawing explaining the lifting scheme in the Haar basis and shows processing at the analysis (encoding) side.
Figure 6B:
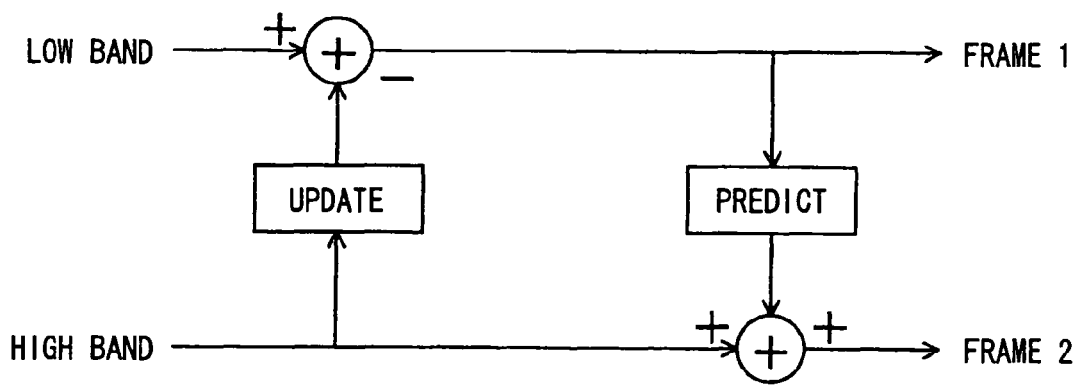
FIG. 6B is a drawing explaining the lifting scheme in the Haar basis and shows processing at the synthesis (decoding) side.
Figure 7:
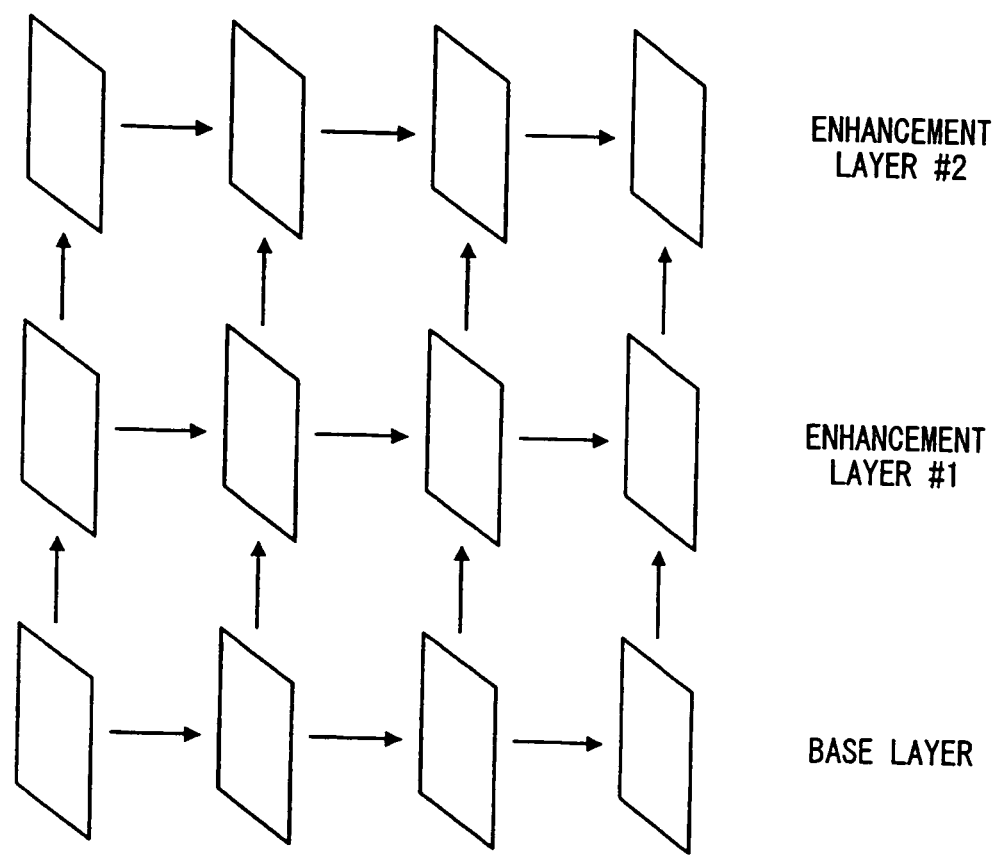
FIG. 7 is a drawing showing the example of frame structure of scalable encoding.

DESCRIPTION OF REFERENCE SYMBOLS 101 picture input section
102 motion detection section
103 differential encoding section
104 prediction picture generation section
105 decoding section
106 reference picture memory
107 motion vector storage memory
108 detected motion vector selection section
109 motion vector selection section
110 motion vector designation encoding section
111 detected motion vector designation encoding section
112 detected motion vector encoding section
113 encoded amount measuring section
114 reference picture selection section
115 reference picture designation encoding section
116 reference motion vector setting section
117 differential motion vector encoding section
118 motion vector storage potion
119 motion vector storage determination section
120 motion vector storage designation encoding section
121 motion vector scaling section
122 scaling encoding section
123 reference motion vector correspondence encoding section
124 motion vector generation section
125 generated motion vector encoding section
201 decoded picture generation section
202 detected motion vector decoding section
203 detected motion vector designation decoding section
204 motion vector designation decoding section
205 prediction picture generation section
206 reference picture memory
207 motion vector storage memory
208 detected motion vector selection section
209 motion vector selection section
210 reference picture selection section
211 reference picture designation decoding section
216 reference motion vector setting section
217 differential motion vector decoding section
218 differential motion vector computation section
219 motion vector storage section
220 motion vector storage designation decoding section
221 motion vector scaling section
222 scaling decoding section
223 reference motion vector correspondence decoding section
224 generated motion vector decoding section

BEST MODE FOR CARRYING OUT THE INVENTION

The embodiments of the picture encoding apparatus and the picture decoding apparatus of the present invention shall be explained using the accompanying drawings. A procedure is shown for encoding a picture by dividing it into a plurality of blocks. Three motion vectors are stored, with one selected therefrom to be encoded.

[First Embodiment]

Figure 8:
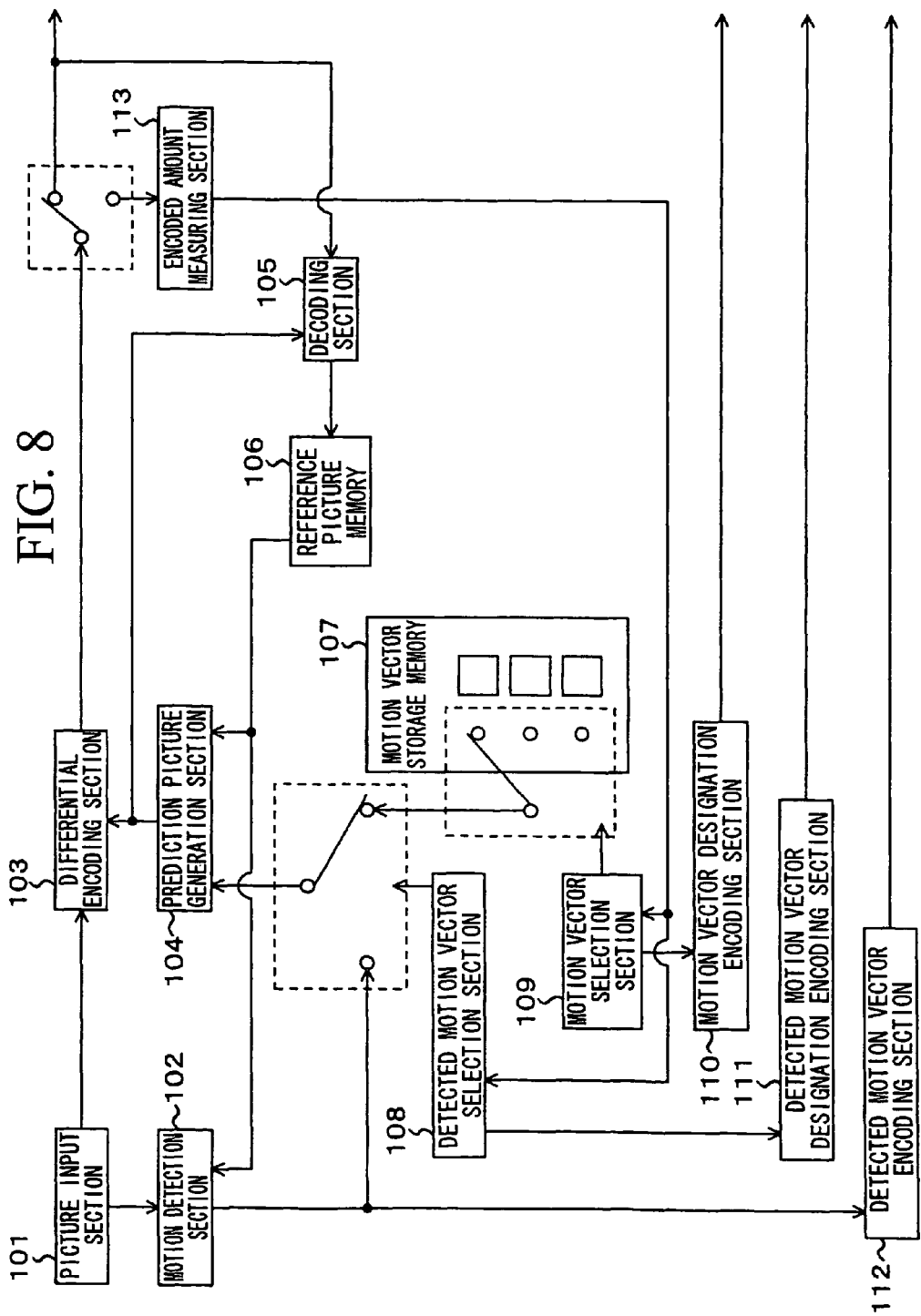
FIG. 8 is a block diagram showing the constitution of the picture encoding apparatus according to the first embodiment of the present invention.

The picture encoding apparatus according to the first embodiment shall be explained. FIG. 8 shows a schematic of the apparatus. The apparatus is provided with: a picture input section 101 that takes in picture information; a prediction picture generation section 104 that generates a prediction picture; a differential encoding section 103 that encodes a differential between the input picture information and the prediction picture; a motion detection section 102 that performs motion detection; a motion vector storage memory 107 that stores motion vectors; a motion vector selection section 109 that selects one motion vector from the motion vector storage memory 107; a motion vector designation encoding section 110 that encodes motion vector designation information that designates the motion vector selected by the motion vector selection section 109; a detected motion vector selection section 108 that selects either of the motion vector detected by the motion detection section 102 or the motion vector selected by the motion vector selection section 109; a detected motion vector designation encoding section 111 that encodes detected motion vector designation information that designates the motion vector selected by the detected motion vector selection section 108; a detected motion vector encoding section 112 that encodes the motion vector detected by the motion detection section 102; a reference picture memory 106 that stores decoded pictures; a decoding section 105 that generates decoded pictures by decoding the differential encoded data generated by the differential encoding section 103; and an encoded amount measuring section 113 that measures the total of the encoded amount of the differential encoded data generated by the differential encoding section 103 and the encoded amount of the motion vector.

Three motion vectors shall be stored beforehand in the motion vector storage memory 107. Moreover, the motion vector designation encoding section 110 shall output the codes 0, 10, and 11 for the motion vector designation information that designates the three motion vectors stored in the motion vector storage memory 107. Moreover, the detected motion vector designation encoding section 111 shall output 0 in the case of the motion vector detected by the motion detection section 102 and shall output 1 in the case of the motion vector selected by the motion vector selection section 109. In the detected motion vector encoding section 112, each component of a motion vector shall be encoded using the motion vector encoding method adopted in MPEG-4. Moreover, a previous frame shall already be encoded and a decoded picture shall be stored in the reference picture memory 106.

An input picture is encoded as follows with this as a basis. First, the picture input section 101 takes in a frame and divides it into macroblocks. Next, the following encoding is performed for every macroblock.

The motion detection section 102 performs motion detection on the present macroblock. The detected motion vector selection section 108 selects a motion vector obtained by the motion detection. The prediction picture generation section 104 creates a prediction picture using the motion vector. The differential encoding section 103 then encodes the difference between the present picture and the prediction picture. The encoded amount measuring section 113 measures the generated encoded amount.

Next, the motion vector selection section 109 selects a first motion vector from the motion vector storage memory 107. The detected motion vector selection section 108 selects the motion vector selected by the motion vector selection section 109. The prediction picture generation section 104 generates a prediction picture using the motion vector. The differential encoding section 103 encodes the difference between the present picture and the prediction picture. The encoded amount measuring section 113 measures the generated encoded amount.

Next, the motion vector selection section 109 selects a second motion vector from the motion vector storage memory 107. The detected motion vector selection section 108 selects the motion vector selected by the motion vector selection section 109. The prediction picture generation section 104 generates a prediction picture using the motion vector. The differential encoding section 103 encodes the difference between the present picture and the prediction picture. The encoded amount measuring section 113 measures the generated encoded amount.

Next, the motion vector selection section 109 selects a third motion vector from the motion vector storage memory 107. The detected motion vector selection section 108 selects the motion vector selected by the motion vector selection section 109. The prediction picture generation section 104 generates a prediction picture using the motion vector. The differential encoding section 103 encodes the difference between the present picture and the prediction picture. The encoded amount measuring section 113 measures the generated encoded amount.

The detected motion vector selection section 108 selects the motion vector for the case in which the generated encoded amount obtained by the encoded amount measuring section 113 is the least. When the motion vector selected by the motion vector selection section 109 is to be selected, the motion vector selection section 109 moreover selects the motion vector for the case in which the encoded amount obtained by the encoded amount measuring section 113 is the least.

Using the motion vector obtained as above, the prediction picture generation section 104 generates a prediction picture, and the differential encoding section 103 encodes the difference. The detected motion vector designation encoding section 111 encodes detected motion vector designation information. When the detected motion vector designation information specifies the motion vector selected by the motion vector selection section 109, the motion vector designation encoding section 110 encodes the motion vector designation information. When the detected motion vector designation information designates the motion vector obtained by the motion detection section 102, the detected motion vector encoding section 112 encodes a motion vector.

The above processing is performed on all the macroblocks. The decoding section 105 decodes the encoded difference, creates a decoded picture using the prediction picture, and stores the decoded picture in the reference picture memory 106. Thereby, the present frame can be encoded.

Figure 9:
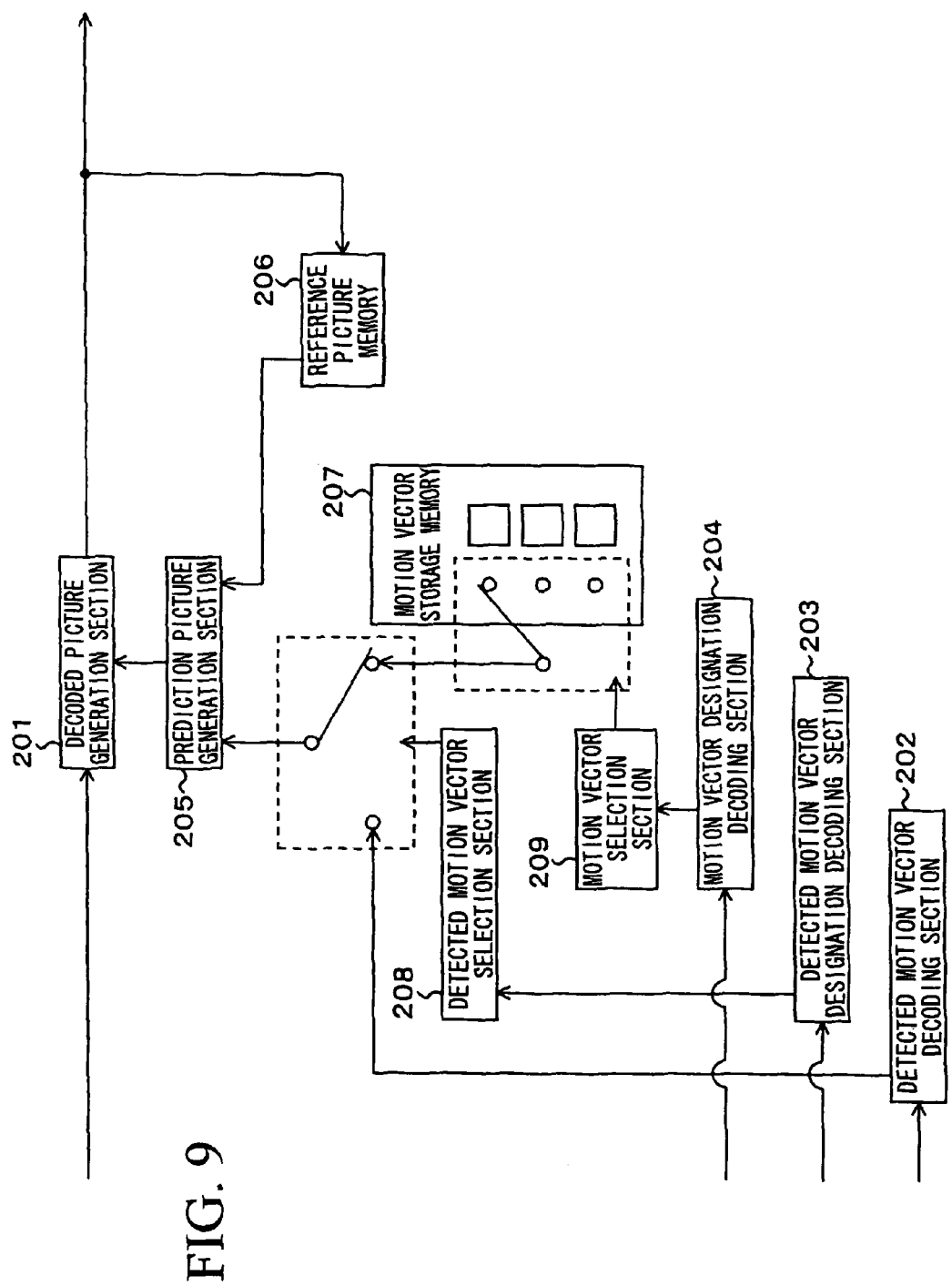
FIG. 9 is a block diagram showing the constitution of the picture decoding apparatus according to the first embodiment of the present invention.

The decoding apparatus shall next be explained. FIG. 9 shows a schematic of the apparatus. The decoding apparatus is provided with: a prediction picture generation section 205 that generates a prediction picture; a decoded picture generation section 201 that decodes differential information and generates a decoded picture using the prediction picture; a motion vector storage memory 207 that stores motion vectors; a motion vector designation decoding section 204 that decodes motion vector designation information; a motion vector selection section 209 that selects one motion vector from the motion vector storage memory 207 using the motion vector designation information; a detected motion vector designation decoding section 203 that decodes detected motion vector designation information; a detected motion vector selection section 208 that selects a motion vector using the detected motion vector designation information; a detected motion vector decoding section 202 that decodes the motion vector; and a reference picture memory 206 that stores decoded pictures.

Three motion vectors shall be stored beforehand in the motion vector storage memory 207. Moreover, the previous frame shall already be decoded and the decoded picture shall be stored in the reference picture memory 206.

With this as a basis, the encoded data encoded by the picture encoding apparatus is decoded as follows. First, a decoded picture is generated in the following way for each macroblock. The detected motion vector designation decoding section 203 decodes the detected motion vector designation information. The detected motion vector selection section 208 uses the detected motion vector designation information to choose to decode the motion vector or decode the motion vector designation information. In the case of decoding the motion vector, the detected motion vector decoding section 202 decodes the motion vector. In the case of decoding the motion vector designation information, the motion vector designation decoding section 204 decodes the motion vector designation information, and the motion vector selection section 209 uses the motion vector designation information to select one motion vector from the motion vector storage memory 207. The prediction picture generation section 205 generates a prediction picture using the motion vector, and the decoded picture generation section 201 decodes the differential information and generates a decoded picture using the prediction picture.

The above process is performed for every macroblock. The decoded picture generation section 201 stores the decoded picture in the reference picture memory 206. Thereby, the current frame can be decoded.

According to the present embodiment, in the case of a motion vector that well reflects motion information of a video stored in the motion vector storage memory 107, when the encoded amount of the motion vector detected by the motion detection section 102 is large, by encoding the motion vector designation information instead of encoding the motion vector, the encoded amount of the motion vector can be reduced.

[Second Embodiment]

Figure 10:
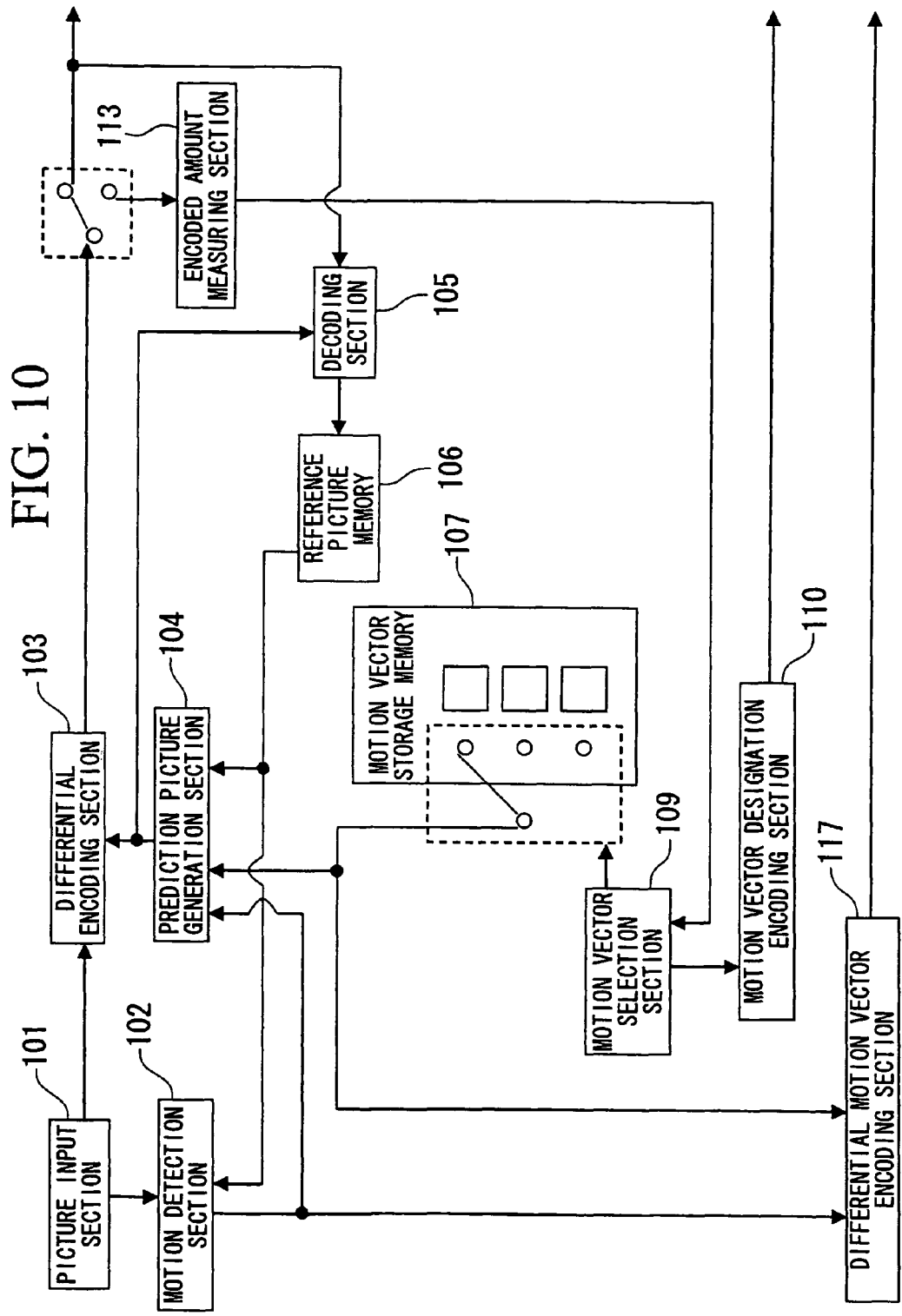
FIG. 10 is a block diagram showing the constitution of the picture encoding apparatus according to the second embodiment of the present invention.
Figure 11:
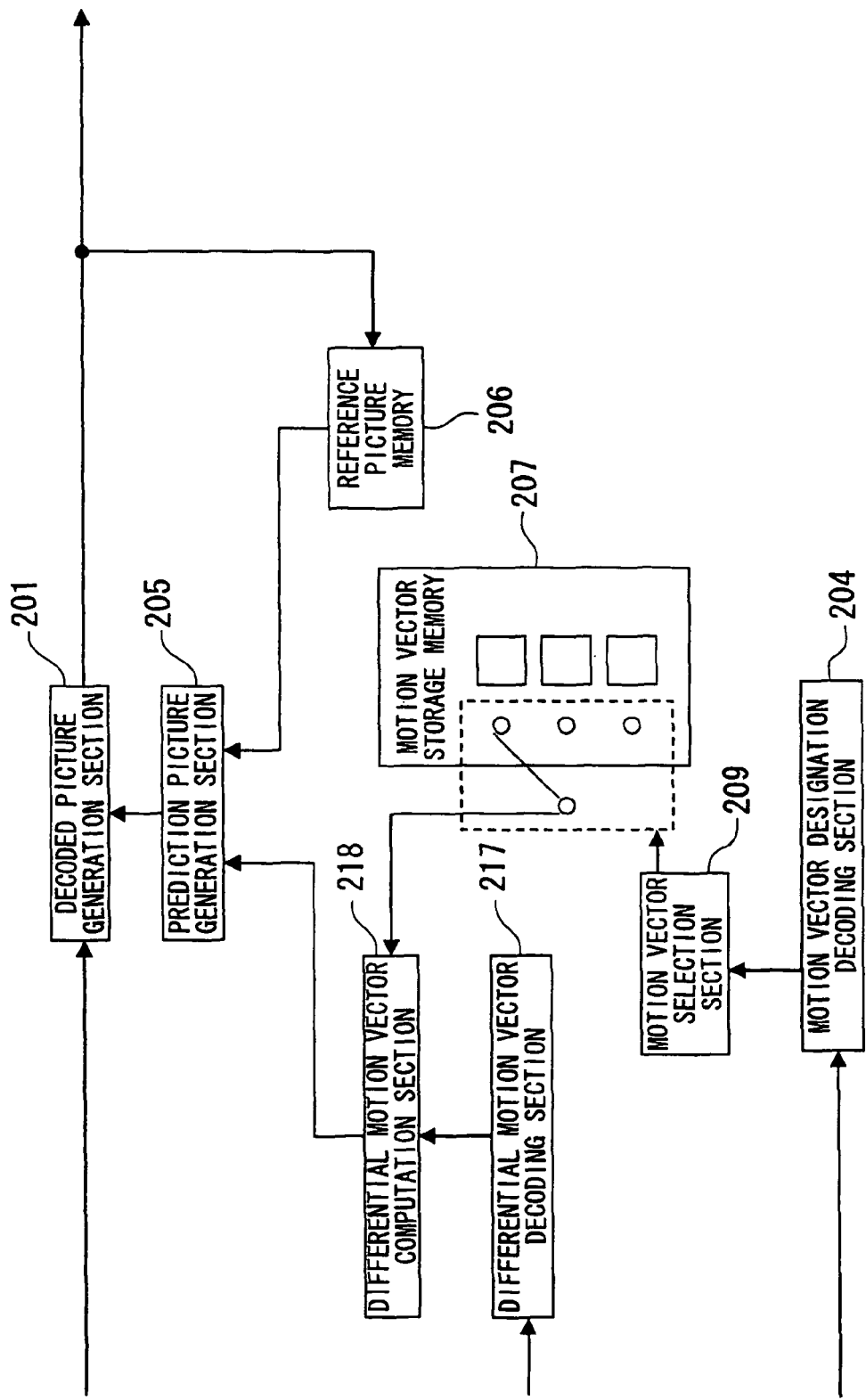
FIG. 11 is a block diagram showing the constitution of the picture decoding apparatus according to the second embodiment of the present invention.

In the aforementioned first embodiment, either of the motion vector detected by the motion detection section 102 or the motion vector stored in the motion vector storage memory 107 was selected. However, the difference between the detected motion vector and the motion vector stored in the motion vector storage memory 107 may be encoded. FIGS. 10 and 11 show the schematic of the apparatus. In this case, as shown in FIG. 10, the picture encoding apparatus is not provided with the detected motion vector encoding section 112, the detected motion vector designation encoding section 111, and the detected motion vector selection section 108, being instead provided with a differential motion vector encoding section 117 that encodes the difference between motion vectors.

Also, as shown in FIG. 11, the picture decoding apparatus is not provided with the detected motion vector decoding section 202, the detected motion vector designation decoding section 203, and the detected motion vector selection section 208. Instead, it is provided with a differential motion vector decoding section 217 that decodes the differential motion vector and a differential motion vector computation section 218 that computes a motion vector from the differential motion vector and the motion vector selected by the motion vector selection section 209.

The picture encoding apparatus obtains a motion vector for each macroblock by performing the following. The motion detection section 102 performs motion detection on the current macroblock. The prediction picture production section 104 produces a prediction picture using the detected motion vector. The differential encoding section 103 encodes the differential between the present picture and the prediction picture. Then, the motion vector selection section 109 selects a first motion vector from the motion vector storage memory 107. The differential motion vector encoding section 117 encodes the differential between the motion vector obtained by the motion detection and the first motion vector. The encoded amount measuring section 113 measures the generated encoded amount.

The motion vector selection section 109 selects the second motion vector from the motion vector storage memory 107. The differential motion vector encoding section 117 encodes the difference between the motion vector obtained by motion detection and the second motion vector. The encoded amount measuring section 113 measures the generated encoded amount.

The motion vector selection section 109 selects the third motion vector from the motion vector storage memory 107. The differential motion vector encoding section 117 encodes the difference between the motion vector obtained by motion detection and the third motion vector. The encoded amount measuring section 113 measures the generated encoded amount. The motion vector selection section 109 selects the motion vector for the case in which the generated encoded amount obtained by the encoded amount measuring section 113 is the least.

In the picture decoding device, the motion vector is determined as follows for every macroblock. The motion vector designation decoding section 204 decodes the motion vector designation information, and the motion vector selection section 209 uses the motion vector designation information to select one motion vector from the motion vector storage memory 207. The differential motion vector decoding section 217 decodes the differential motion vector, and the differential motion vector computation section 218 generates a motion vector from the differential motion vector and the motion vector selected by the motion vector selection section 209.

In the first and second embodiments, the picture encoding apparatus may store motion vectors obtained by the motion detection section 102 by overwriting on the motion vector storage memory 107.

[Third Embodiment]

Figure 12:
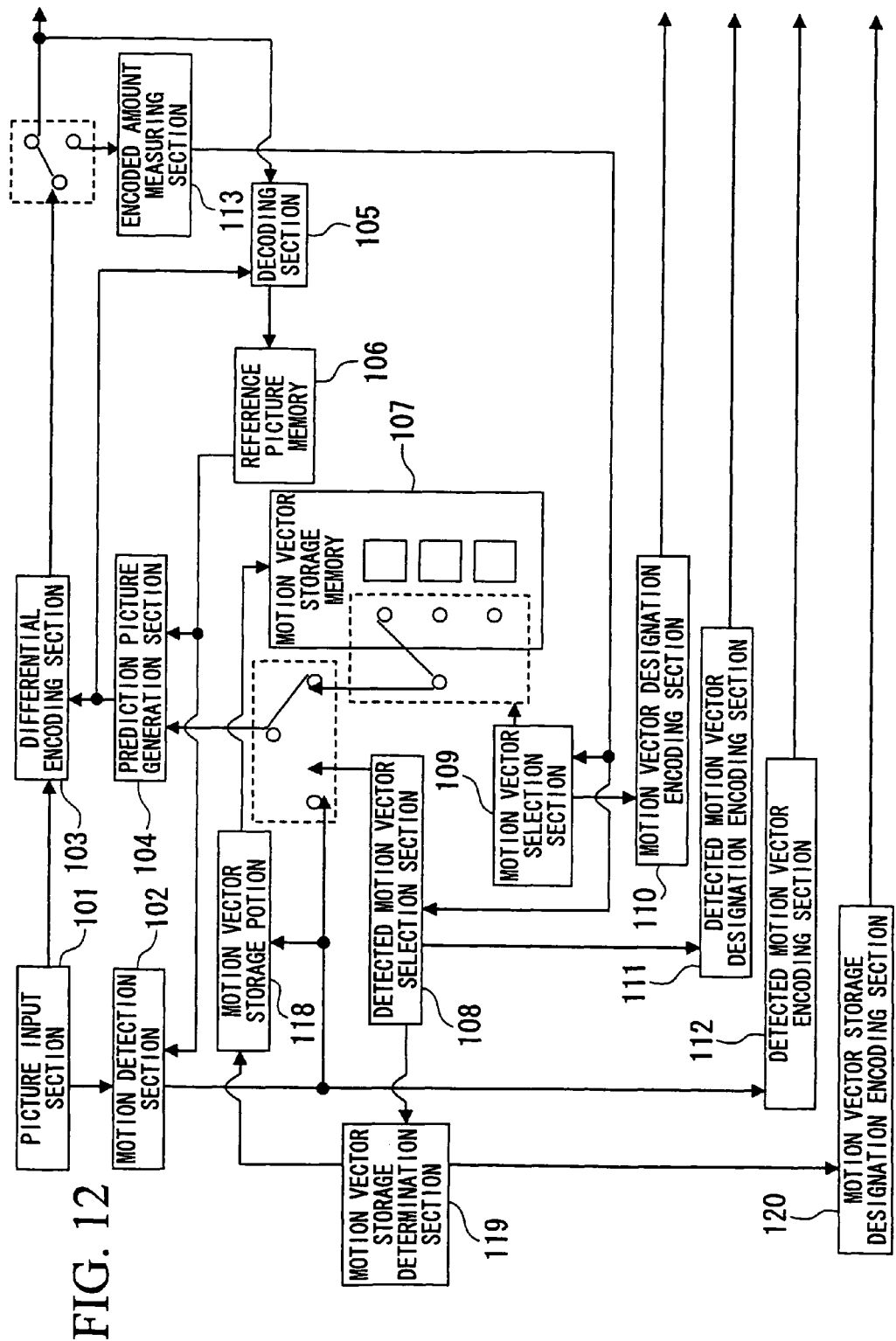
FIG. 12 is a block diagram showing the constitution of the picture encoding apparatus according to the third embodiment of the present invention.
Figure 13:
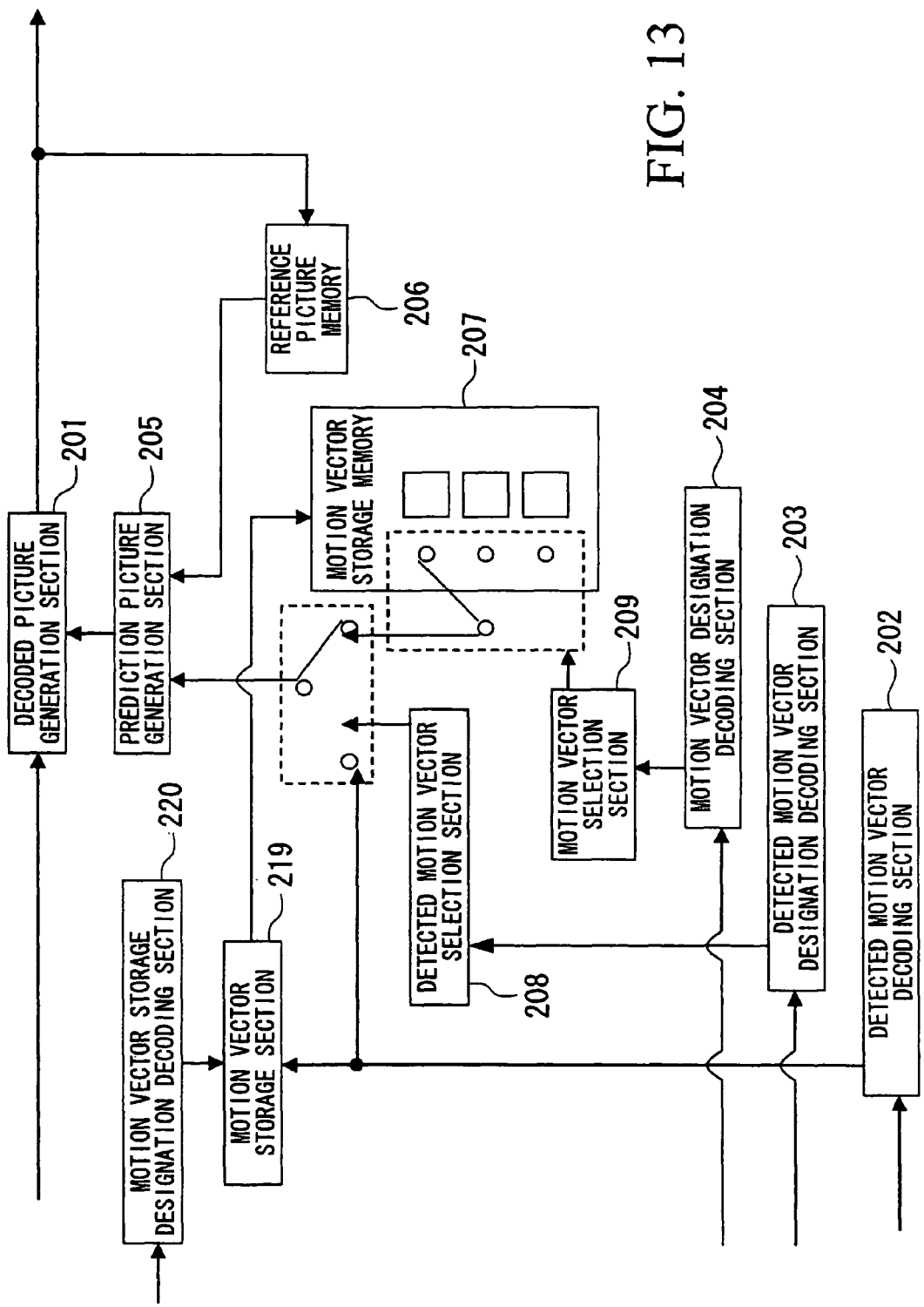
FIG. 13 is a block diagram showing the constitution of the picture decoding apparatus according to the third embodiment of the present invention.

In the aforementioned embodiments, information may be encoded to designate whether or not to perform storage in the motion vector storage memory 107. FIGS. 12 and 13 show schematics of the apparatus in the case of the present embodiment based on the first embodiment. In this case, as shown in FIG. 12, the constitution shown in FIG. 8 is newly provided with a motion vector storage section 118 that stores motion vectors; a motion vector storage determination section 119 which determines whether or not to store a motion vector; and a motion vector storage designation encoding section 120 which encodes information for specifying whether or not to store a motion vector.

When for example the motion vector obtained by motion detection is selected by the detected motion vector selection section 108, the motion vector storage determination section 119 makes the determination to store that motion vector. In the case of the motion vector storage determination section 119 determining to store the motion vector, the motion vector storage section 118 stores up the motion vector in the motion vector storage memory 107. The motion vector storage designation encoding section 120 encodes the information that designates whether to store the motion vector. The motion vector storage designation encoding section 120 may encode the motion vector storage designation information for every macroblock and may encode the motion vector storage designation information in units of a plurality of macroblocks such as a slice or frame.

In order to decode encoded data produced in this manner, as shown in FIG. 13, the constitution of the picture decoding apparatus shown in FIG. 9 is newly provided with a motion vector storage section 219 that stores motion vectors and a motion vector storage designation decoding section 220 that decodes information designating whether or not to store motion vectors. The motion vector storage designation decoding section 220 decodes information designating whether or not to store motion vectors, and when there is the designation to store a motion vector, the motion vector storage section 219 stores the motion vector in the motion vector storage memory 207.

[Fourth Embodiment]

Figure 14:
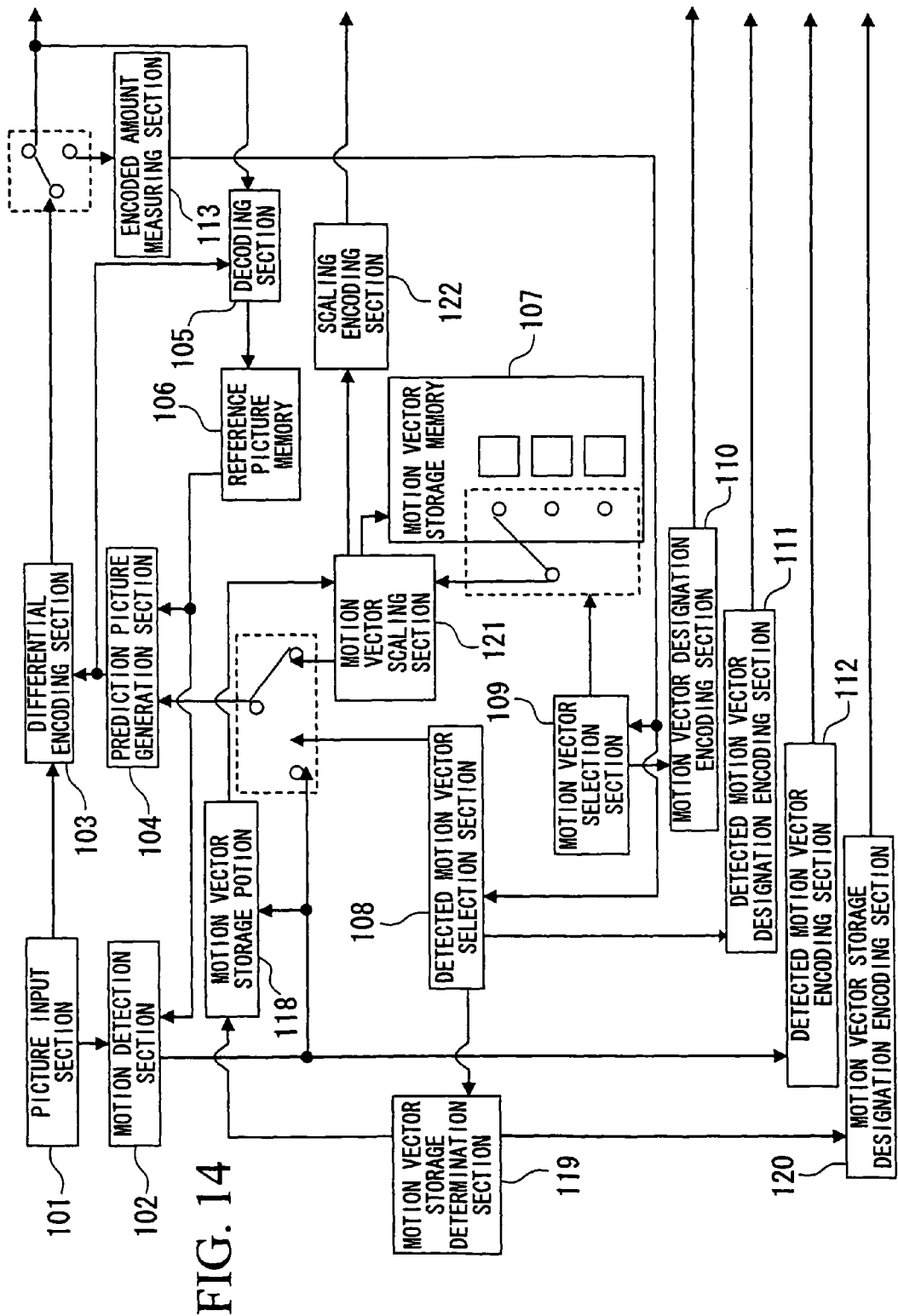
FIG. 14 is a block diagram showing the constitution of the picture encoding apparatus of the fourth embodiment of the present invention which is based on the third embodiment, showing the constitution in the case of encoding scaling information.
Figure 15:
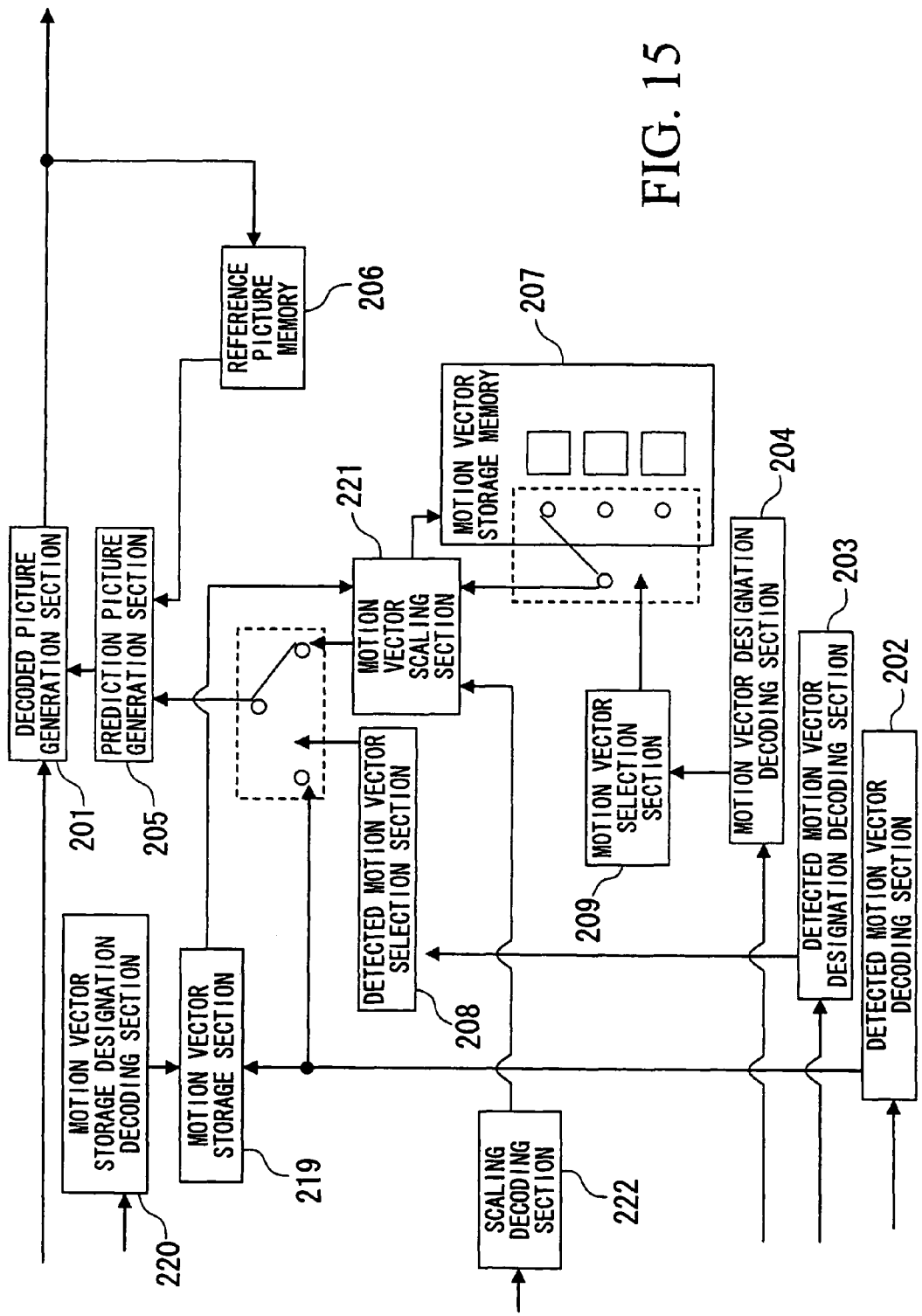
FIG. 15 is a block diagram showing the constitution of the picture decoding apparatus of the fourth embodiment of the present invention which is based on the third embodiment, showing the constitution in the case of decoding scaling information.

In the above embodiments, prior to storing a motion vector in the motion vector storage memory 107, it is possible to reduce the amount of memory required for storing the motion vector by scaling it to reduce the value of the motion vector components. FIGS. 14 and 15 show schematics of the apparatus in which the present embodiment is realized based on the third embodiment.

In order to achieve the present embodiment, as shown in FIG. 14, the picture encoding apparatus should be provided with a motion vector scaling section 121 that changes the value of the motion vector by using motion vector scaling information. A motion vector scaled in advance to a low accuracy, such as integer-pixel accuracy, is stored in the motion vector storage memory 107, and after the motion vector is selected by the motion vector selection section 109, the motion vector scaling section 121 may scale the motion vector to a motion vector with higher accuracy such as half-pixel accuracy or quarter-pixel accuracy. Also, when storing the motion vector, prior to the motion vector storage potion 118 storing the motion vector in the motion vector storage memory 107, the motion vector scaling section 121 may scale the motion vector from a high accuracy of half-pixel or quarter-pixel accuracy to a low accuracy of integer-pixel accuracy.

In addition, motion vector scaling information that is necessary information for scaling computation of the motion vector may be encoded. The motion vector scaling information may be information that designates the calculation formula for obtaining the scaled value when for example the motion vector scaling section 121 scales a motion vector from integer-pixel accuracy to half-pixel accuracy. Thereby, it is possible to change the scaling calculation formula by the unit of a macroblock or a plurality of macroblocks, for example. In this case, the picture encoding apparatus is provided with the scaling encoding section 122 that encodes motion vector scaling information.

On the other hand, as shown in FIG. 15, the picture decoding apparatus is provided with a motion vector scaling section 221 that changes the value of the motion vector using motion vector scaling information and a scaling decoding section 222 that that decodes motion vector scaling information. The operation of the motion vector scaling section 221 is identical to the motion vector scaling section 121 of the picture encoding apparatus. Also, the scaling decoding section 222 changes the scaling calculation formula by decoding the motion vector scaling information necessary for scaling computation of the motion vector.

Figure 16:
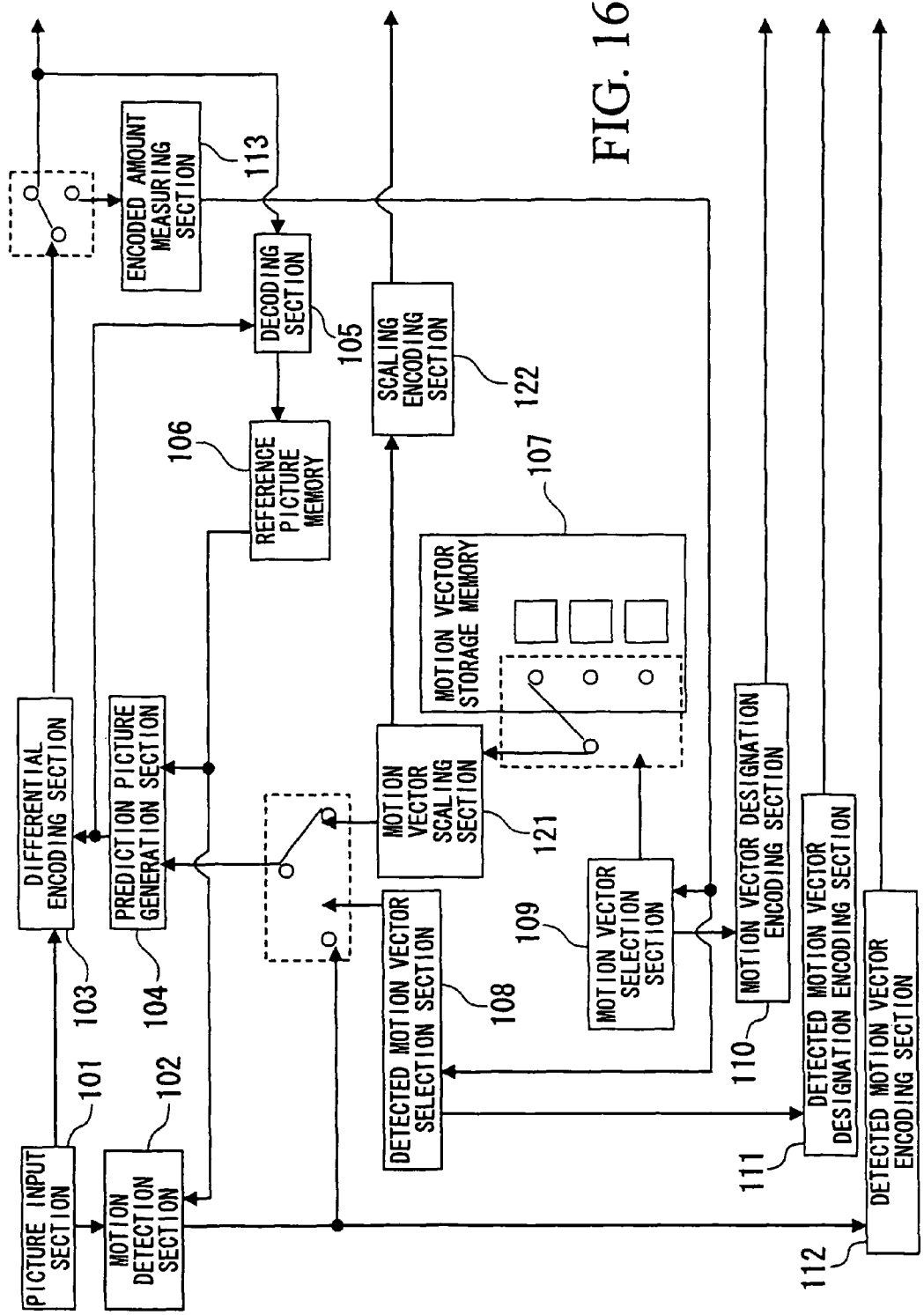
FIG. 16 is a block diagram showing the constitution of the picture encoding apparatus of the fourth embodiment of the present invention which is based on the first embodiment, showing the constitution in the case of encoding scaling information.
Figure 17:
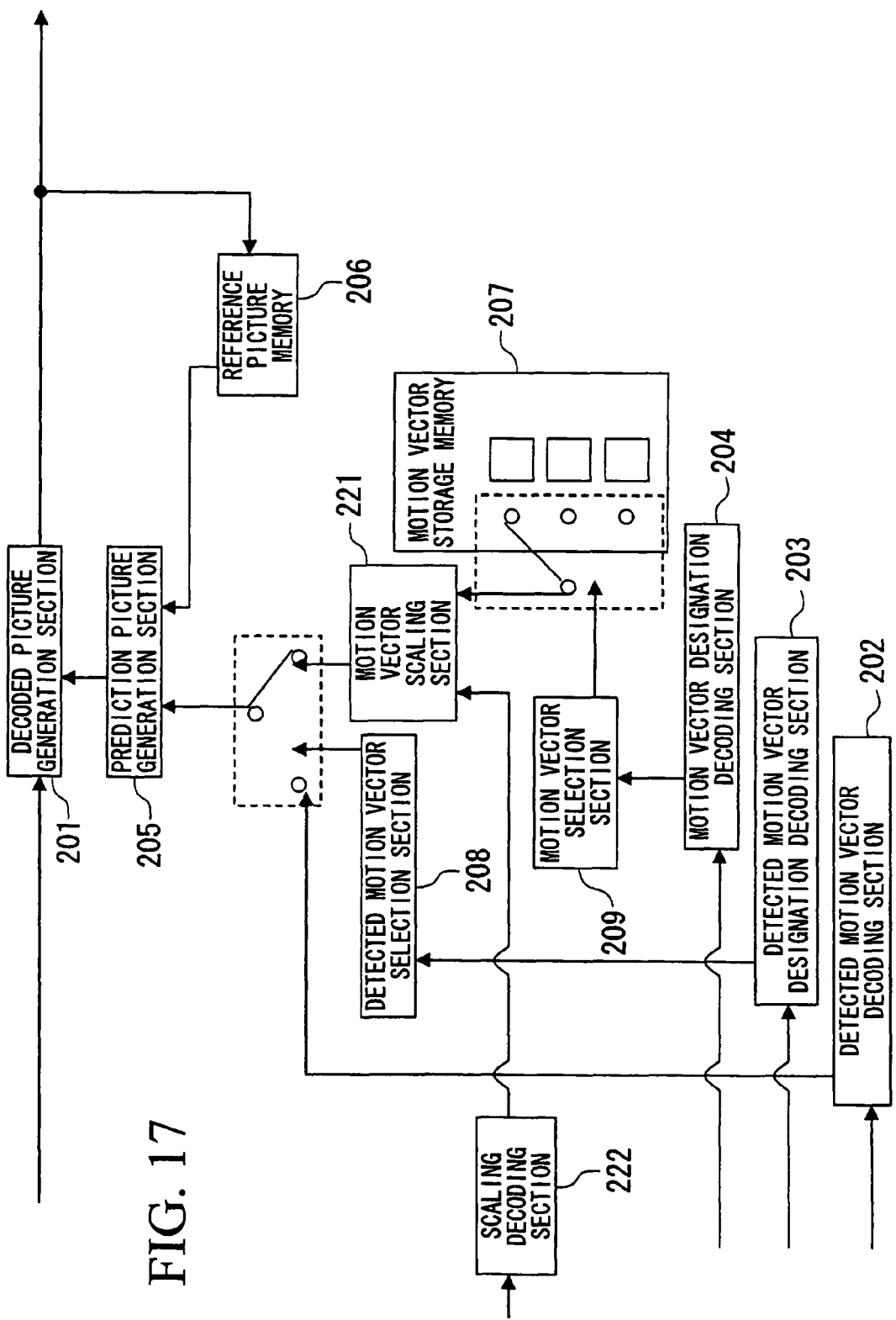
FIG. 17 is a block diagram showing the constitution of the picture decoding apparatus of the fourth embodiment of the present invention which is based on the first embodiment, showing the constitution in the case of decoding scaling information.
Figure 18:
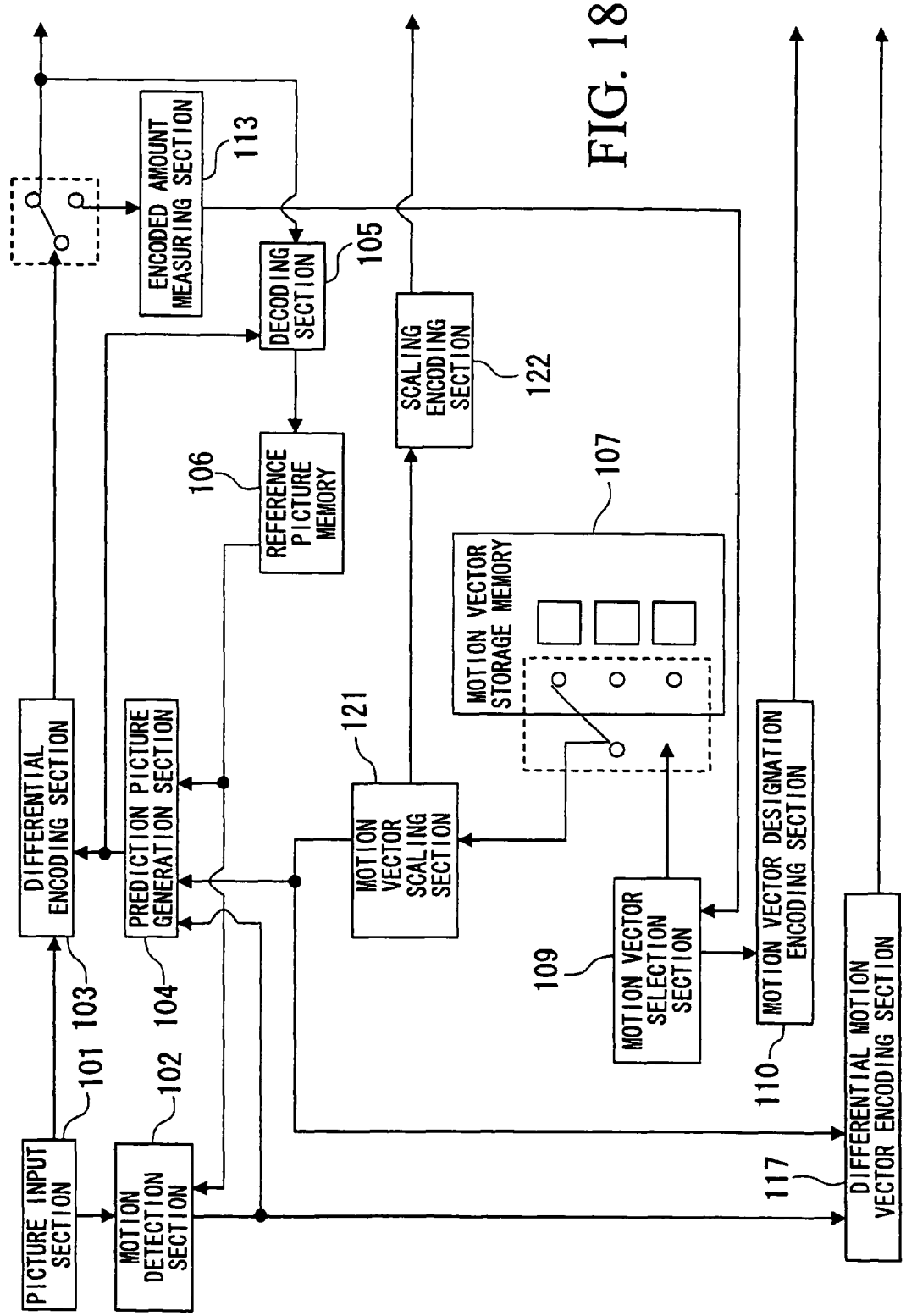
FIG. 18 is a block diagram showing the constitution of the picture encoding apparatus of the fourth embodiment of the present invention which is based on the second embodiment, showing the constitution in the case of encoding scaling information.
Figure 19:
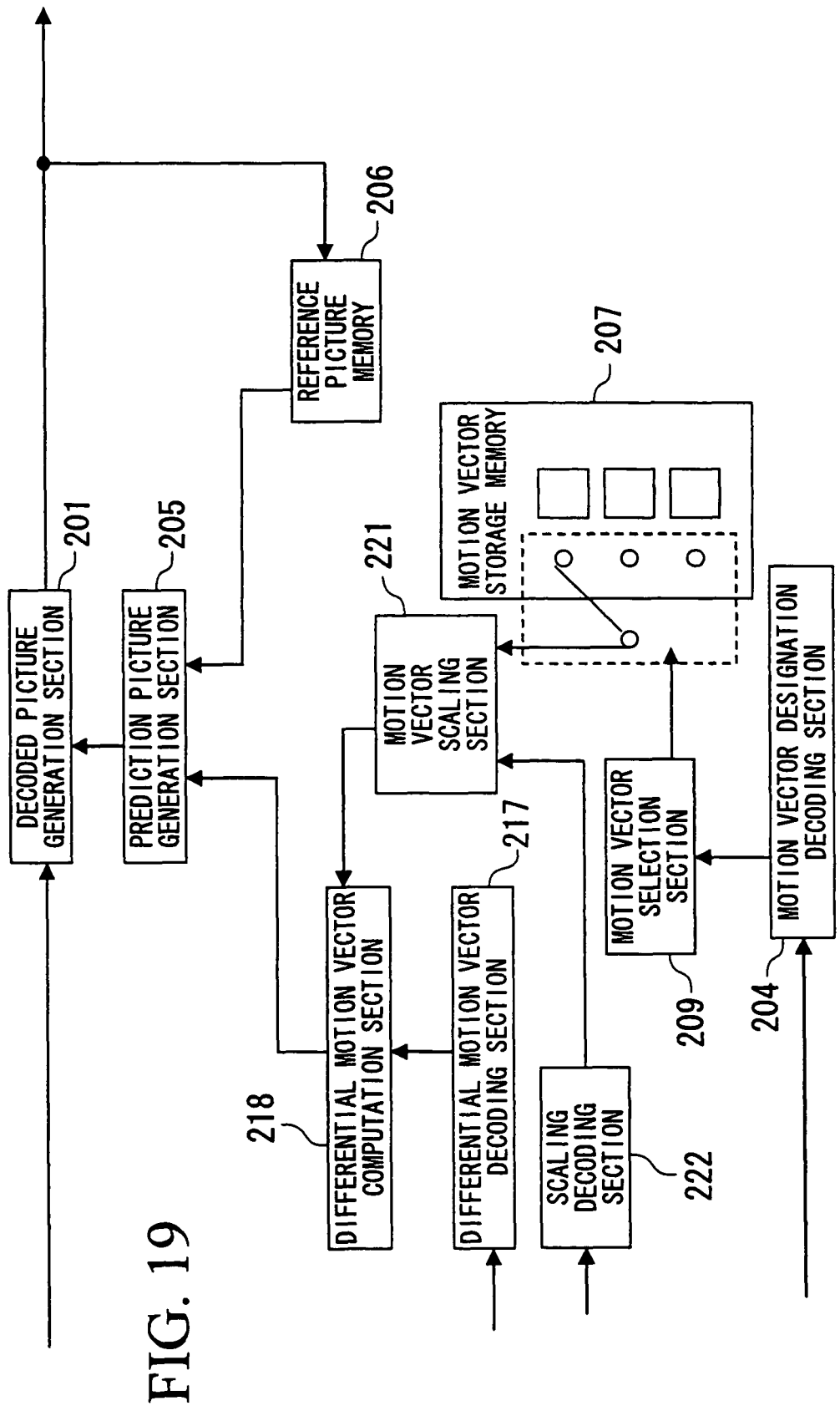
FIG. 19 is a block diagram showing the constitution of the picture decoding apparatus of the fourth embodiment of the present invention which is based on the second embodiment, showing the constitution in the case of decoding scaling information.
Figure 20:
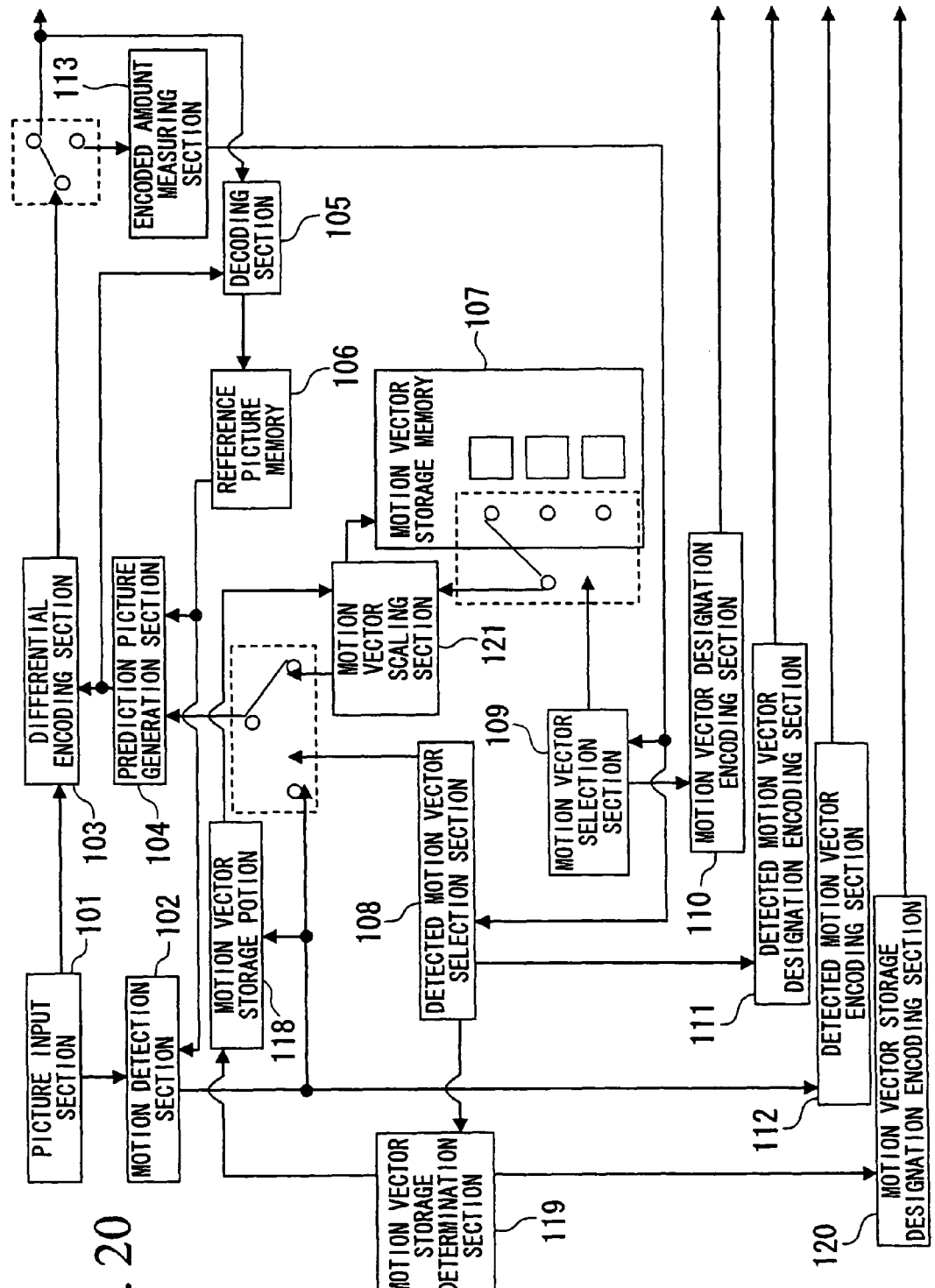
FIG. 20 is a block diagram showing the constitution of the picture encoding apparatus of the fourth embodiment of the present invention which is based on the third embodiment, showing the constitution in the case of not encoding scaling information.
Figure 21:
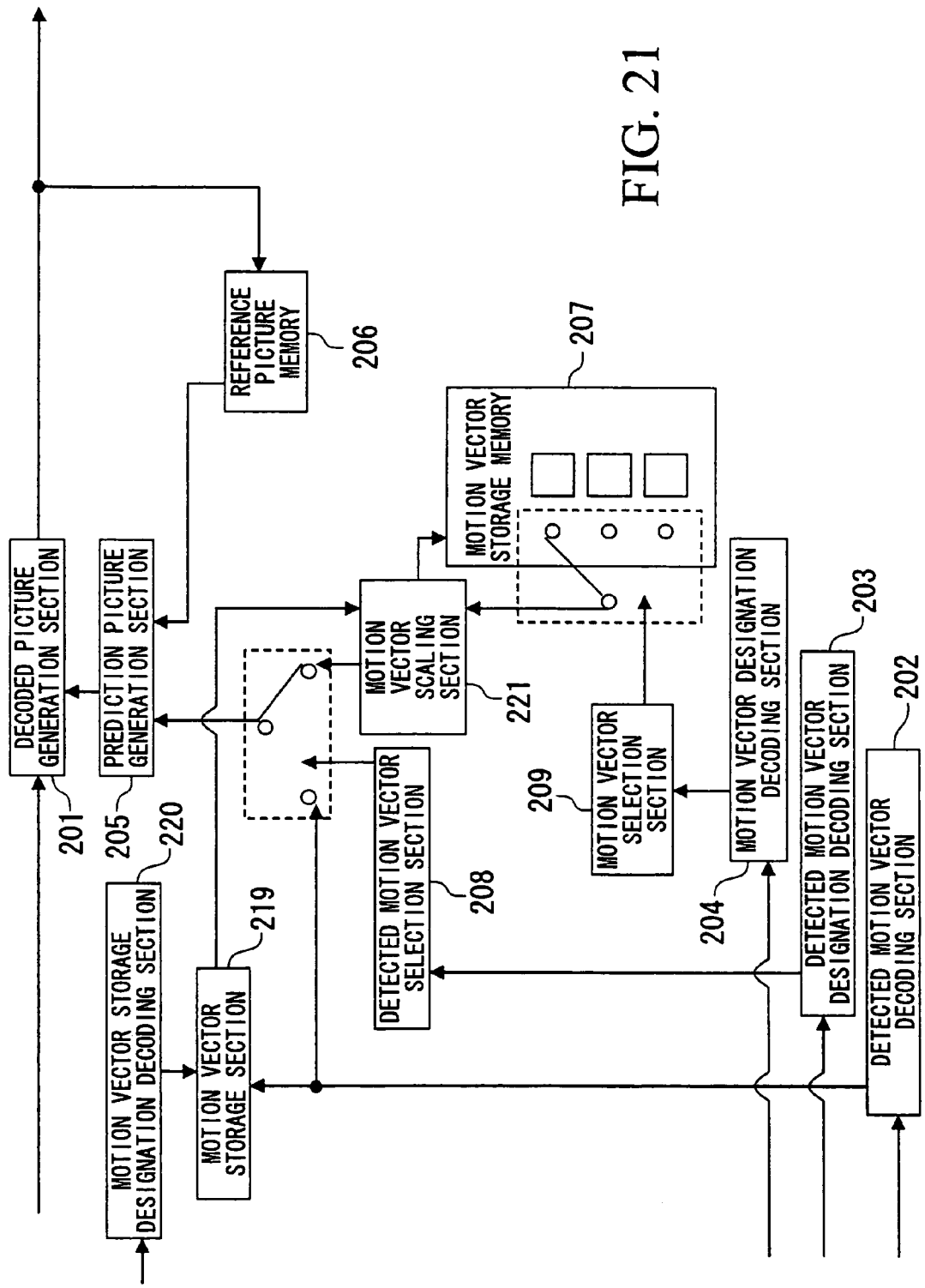
FIG. 21 is a block diagram showing the constitution of the picture decoding apparatus of the fourth embodiment of the present invention which is based on the third embodiment, showing the constitution in the case of not decoding scaling information.
Figure 22:
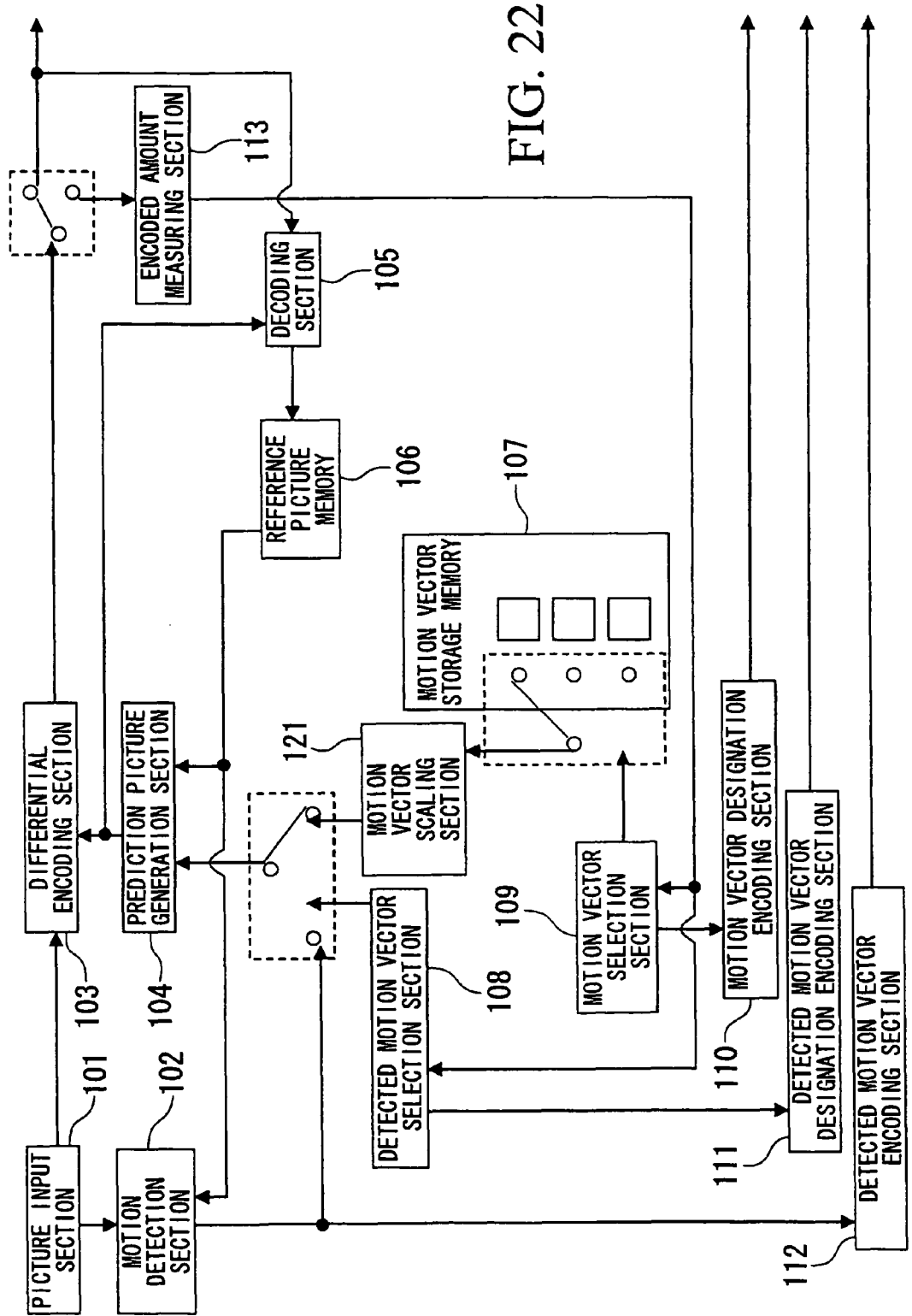
FIG. 22 is a block diagram showing the constitution of the picture encoding apparatus of the fourth embodiment of the present invention which is based on the first embodiment, showing the constitution in the case of not encoding scaling information.
Figure 23:
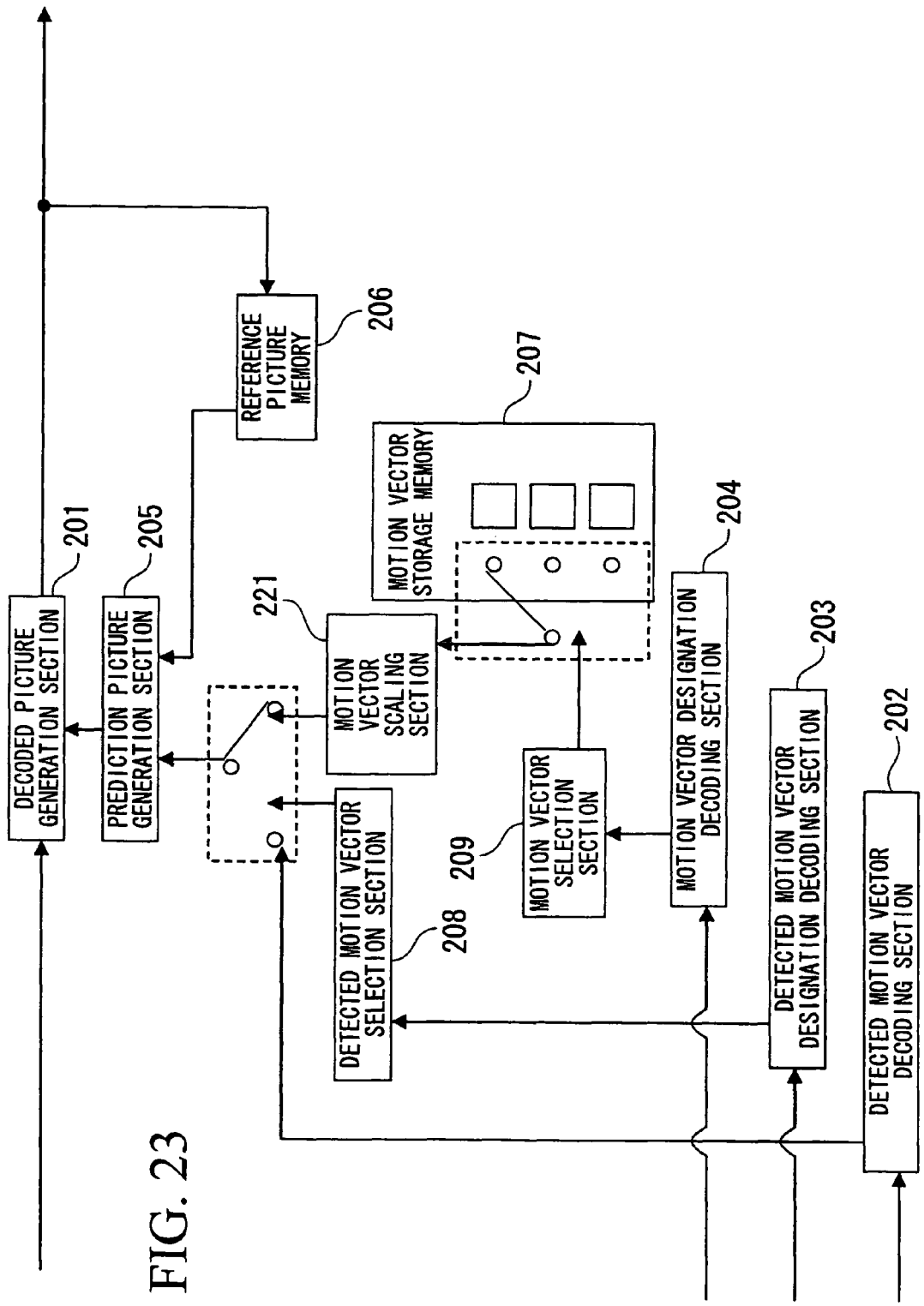
FIG. 23 is a block diagram showing the constitution of the picture decoding apparatus of the fourth embodiment of the present invention which is based on the first embodiment, showing the constitution in the case of not decoding scaling information.
Figure 24:
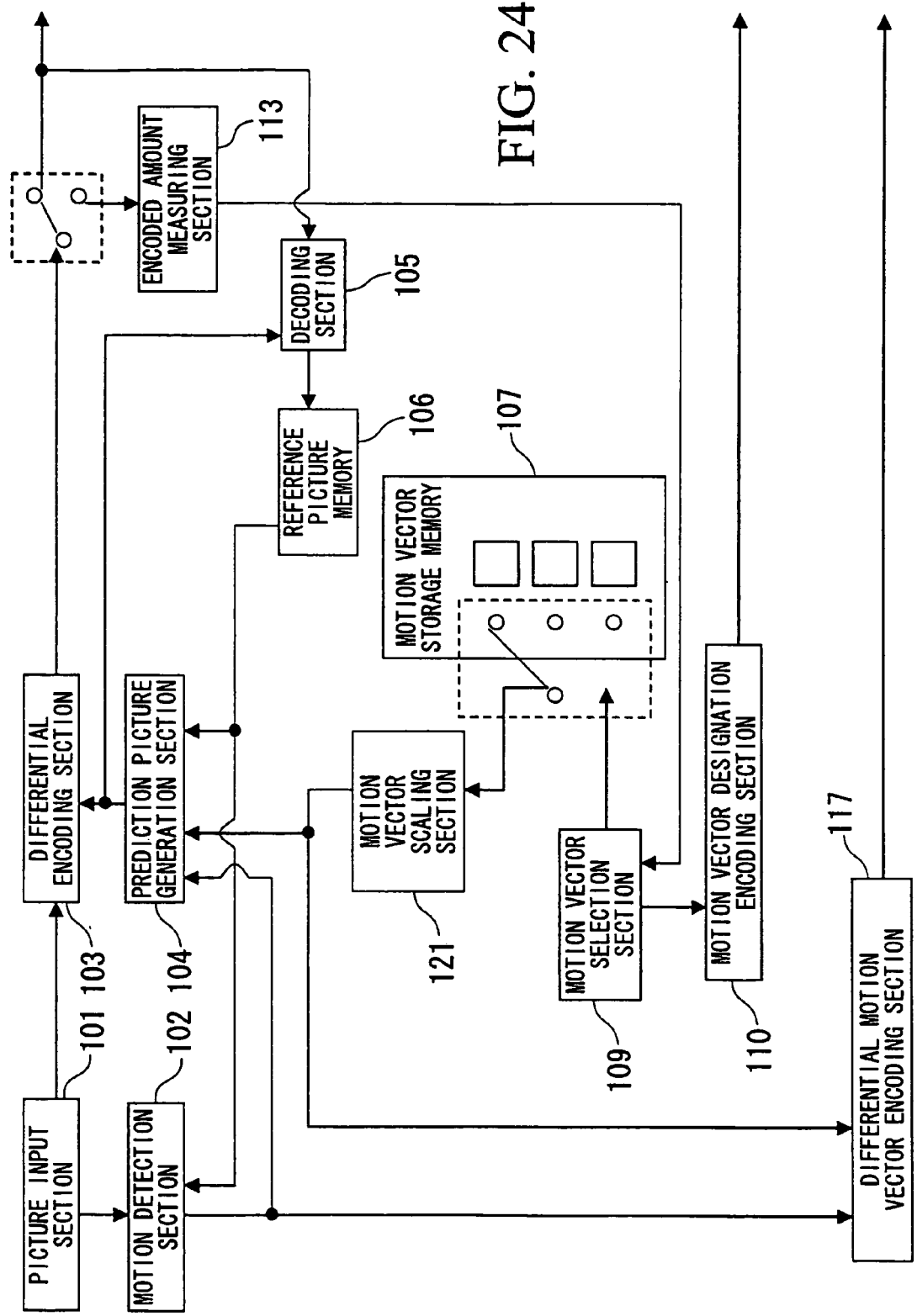
FIG. 24 is a block diagram showing the constitution of the picture encoding apparatus of the fourth embodiment of the present invention which is based on the second embodiment, showing the constitution in the case of not encoding scaling information.
Figure 25:
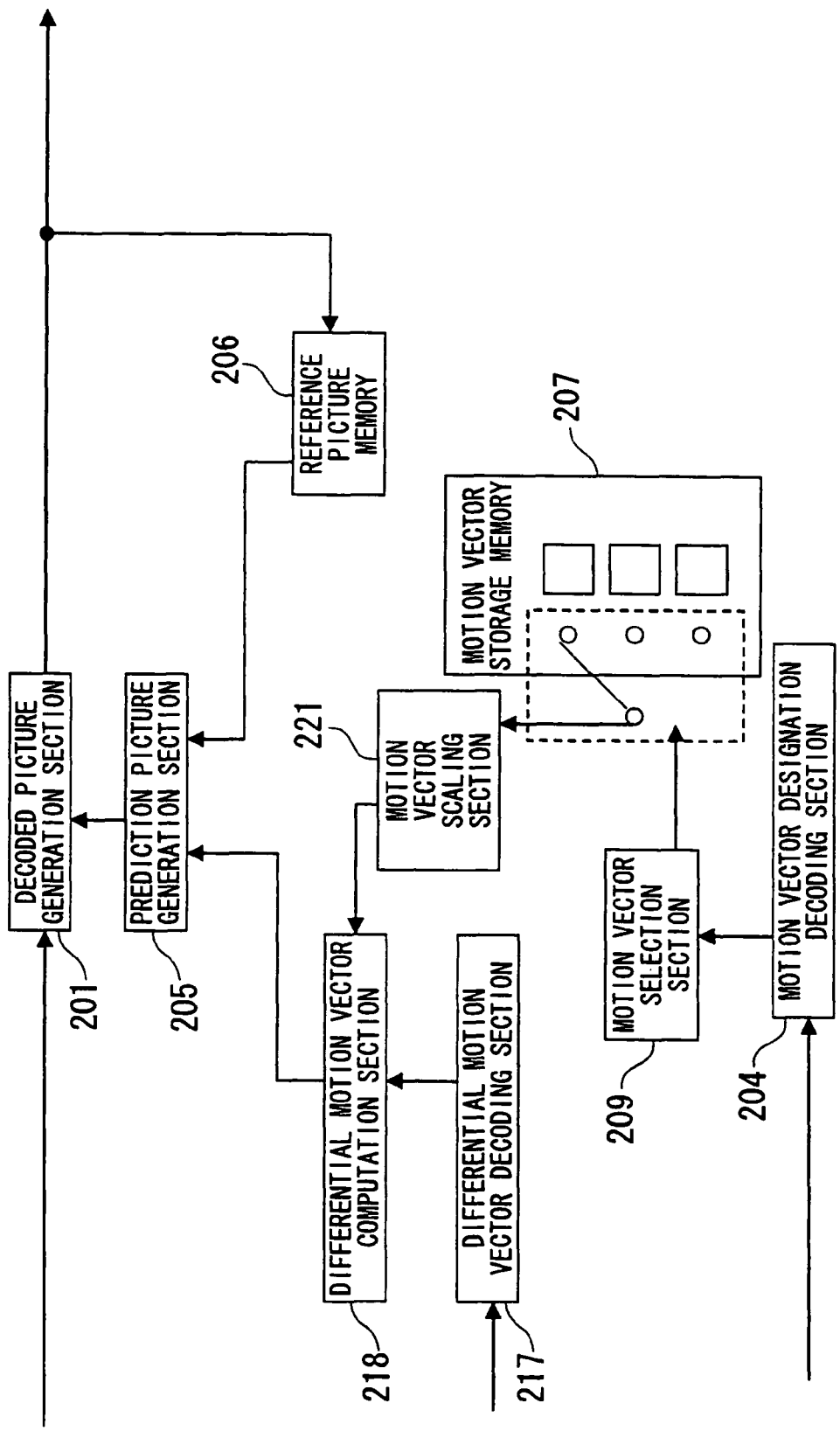
FIG. 25 is a block diagram showing the constitution of the picture decoding apparatus of the fourth embodiment of the present invention which is based on the second embodiment, showing the constitution in the case of not decoding scaling information.

In the above explanation, the present embodiment is achieved based on the third embodiment. However, it may also be realized based on the first embodiment or the second embodiment. FIGS. 16 and 17 show schematics of the apparatus in the case of being based on the first embodiment. Also, FIGS. 18 and 19 show schematics of the apparatus in the case of being based on the second embodiment. In these drawings, the motion vector scaling section 121 and the scaling encoding section 122 (on the picture encoding apparatus side) and the motion vector scaling section 221 and the scaling decoding section 222 (on the picture decoding apparatus side) are added to the first embodiment or the second embodiment.

As is evident from the foregoing, the encoding of scaling information (in the case of the picture encoding apparatus) or the decoding of scaling information (in the case of the picture decoding apparatus) need not be performed, with FIGS. 20 to 25 showing the apparatus schematics in this case. FIGS. 20 to 25 correspond respectively to FIGS. 14 to 19, deleting the scaling encoding section 122 (in the case of the picture encoding apparatus) or the scaling decoding section 222 (in the case of the picture decoding apparatus) from FIGS. 14 to 19.

[Fifth Embodiment]

As the fifth embodiment, a reference picture memory that stores two-frame decoded pictures and a motion vector storage memory that stores two-frame motion vectors are provided, and an example is shown of a method of designating a motion vector simultaneously with the reference picture by the reference picture designation information. The embodiment shows a procedure for the case of encoding a picture by dividing it into a plurality of blocks.

Figure 26:
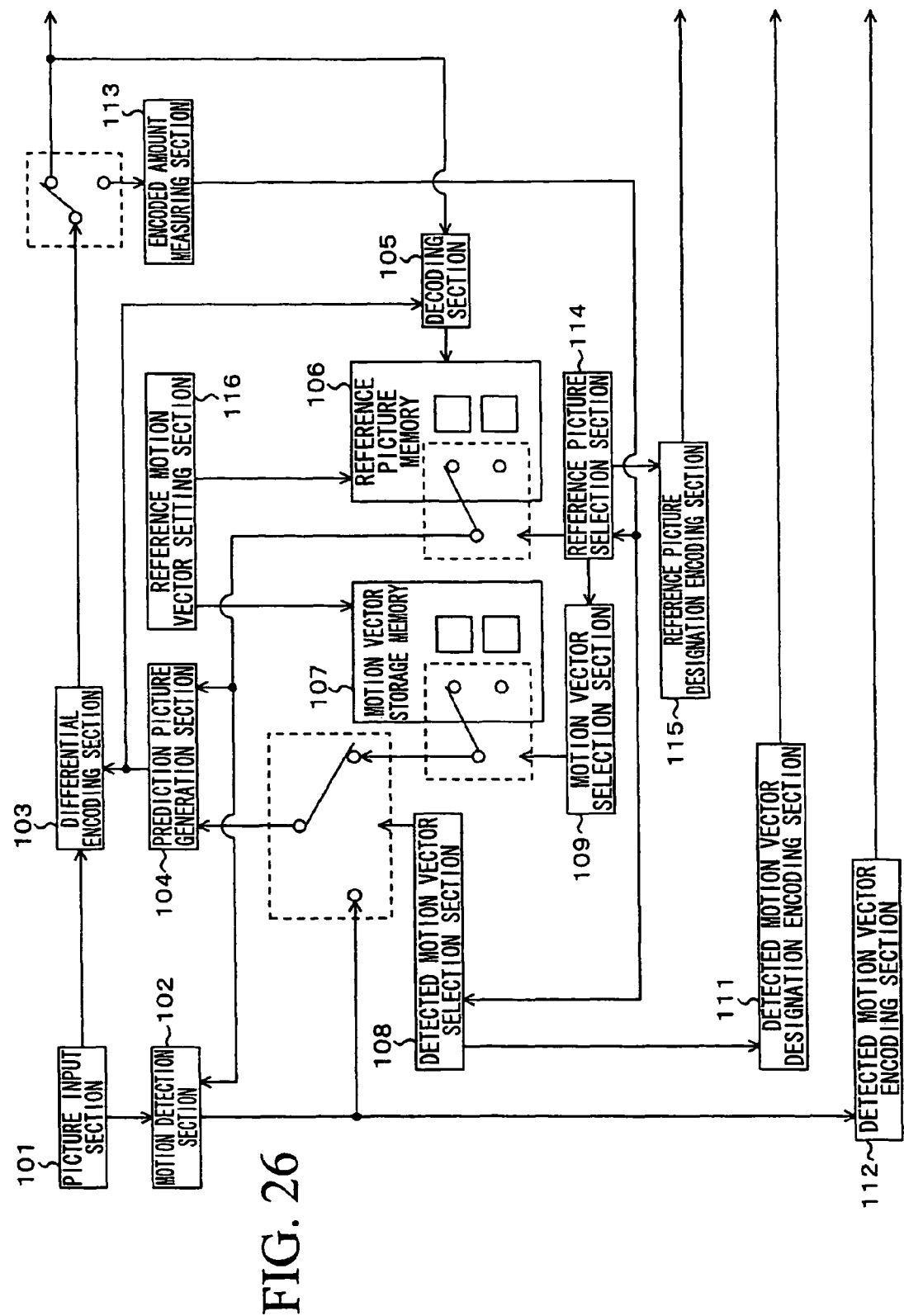
FIG. 26 is a block diagram showing the constitution of the picture encoding apparatus according to the fifth embodiment of the present invention.

The picture encoding apparatus of the fifth embodiment shall now be described. FIG. 26 shows a schematic of the apparatus. The apparatus is provided with: a picture input section 101 that takes in picture information; a prediction picture generation section 104 that generates a prediction picture; a differential encoding section 103 that encodes a differential between the input picture information and the prediction picture; a motion detection section 102 that performs motion detection; a motion vector storage memory 107 that stores motion vectors; a motion vector selection section 109 that selects one motion vector from the motion vector storage memory 107; a reference picture memory 106 that stores decoded pictures; a reference picture selection section 114 that selects a reference picture; a reference picture designation encoding section 115 that encodes reference picture designation information; a reference motion vector setting section 116 that sets the correspondence relation between the motion vector stored in the motion vector storage memory 107 and the reference picture designation information that designates a reference picture; a detected motion vector selection section 108 that selects either of the motion vector detected by the motion detection section 102 or the motion vector selected by the motion vector selection section 109; a detected motion vector designation encoding section 111 that encodes detected motion vector designation information that designates the motion vector selected by the detected motion vector selection section 108; a detected motion vector encoding section 112 that encodes the motion vector detected by the motion detection section 102; a decoding section 105 that generates decoded pictures by decoding the differential encoded data produced by the differential encoding section 103; and an encoded amount measuring section 113 that measures the total of the encoded amount of the differential encoded data generated by the differential encoding section 103 and the encoded amount of the motion vector.

Two-frame motion vectors shall be stored in the motion vector storage memory 107 in advance. Here, since one frame consists of a plurality of macroblocks, motion vectors for the total number of macroblocks in two frames are stored. A decoded picture of two frames is stored in advance in the reference picture memory 106. Also, the reference picture designation encoding section 115 shall perform one-bit fixed-length encoding of the reference picture designation information. Moreover, the detected motion vector designation encoding section 111 shall output 0 in the case of the motion vector detected by the motion detection section 102 and shall output 1 in the case of the motion vector selected by the motion vector selection section 109. In the detected motion vector encoding section 112, each component of a motion vector shall be encoded using the motion vector encoding method adopted in MPEG-4. Also, the motion vector selection section 109 shall select the motion vector of the same position as the present macroblock, among the motion vectors of the frame specified by the reference picture designation information.

The reference motion vector setting section 116 shall associate the reference picture designation information that designates the first reference picture to the first motion vector, and associate the reference picture designation information that designates the second reference picture to the second motion vector.

With this as a basis, the input picture is encoded as follows. First, the reference motion vector setting section 116 associates the reference picture designation information and the motion vector. Then, the picture input section 101 takes in a frame and divides it into macroblocks. Next, the following encoding is performed for every macroblock.

The reference picture selection section 114 selects the first reference picture from the reference picture memory 106. The motion detection section 102 performs motion detection on the present macroblock. The detected motion vector selection section 108 selects a motion vector obtained by the motion detection. The prediction picture generation section 104 creates a prediction picture using the motion vector. The differential encoding section 103 then encodes the difference between the present picture and the prediction picture. The detected motion vector encoding section 112 encodes the motion vector. The encoded amount measuring section 113 measures the generated encoded amount.

Next, the motion vector selection section 109 selects from the motion vector storage memory 107 a first motion vector associated by the reference picture designation information. The detected motion vector selection section 108 selects the motion vector selected by the motion vector selection section 109. The prediction picture generation section 104 generates a prediction picture using the motion vector. The differential encoding section 103 encodes the difference between the present picture and the prediction picture. The encoded amount measuring section 113 measures the generated encoded amount.

Next, the reference picture selection section 114 selects the second reference picture from the reference picture memory 106. The motion detection section 102 performs motion detection on the present macroblock. The detected motion vector selection section 108 selects a motion vector obtained by the motion detection. The prediction picture generation section 104 creates a prediction picture using the motion vector. The differential encoding section 103 then encodes the difference between the present picture and the prediction picture. The detected motion vector encoding section 112 encodes the motion vector. The encoded amount measuring section 113 measures the generated encoded amount.

Next, the motion vector selection section 109 selects from the motion vector storage memory 107 a second motion vector associated by the reference picture designation information. The detected motion vector selection section 108 selects the motion vector selected by the motion vector selection section 109. The prediction picture generation section 104 generates a prediction picture using the motion vector. The differential encoding section 103 encodes the difference between the present picture and the prediction picture. The encoded amount measuring section 113 measures the generated encoded amount.

The reference picture selection section 114 selects the reference picture for the case in which the generated encoded amount obtained by the encoded amount measuring section 113 is the least, and the detected motion vector selection section 108 selects the motion vector for the case in which the generated encoded amount obtained by the encoded amount measuring section 113 is the least. Using the obtained motion vector and reference picture, the prediction picture generation section 104 generates a prediction picture, and the differential encoding section 103 encodes the difference. The reference picture designation encoding section 115 encodes the reference picture designation information. The detected motion vector designation encoding section 111 encodes the detected motion vector designation information. When the detected motion vector selection section 108 selects the motion vector obtained by the motion detection section 102 to be encoded, the detected motion vector encoding section 112 encodes the motion vector.

The above processing is performed on all the macroblocks. The decoding section 105 decodes the encoded difference, creates a decoded picture using the prediction picture, and stores the decoded picture in the reference picture memory 106. Thereby, the present frame can be encoded.

Figure 27:
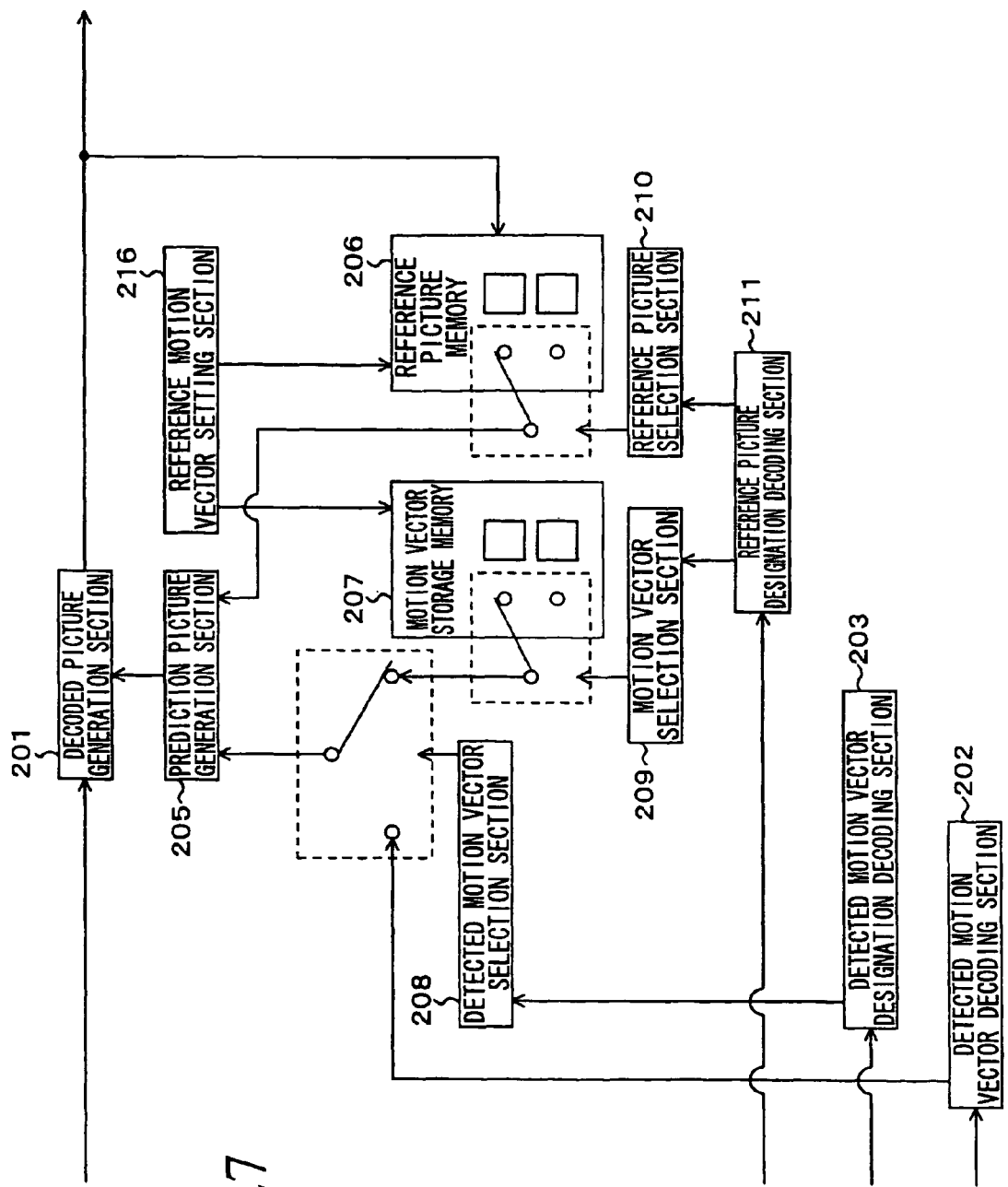
FIG. 27 is a block diagram showing the constitution of the picture decoding apparatus according to the fifth embodiment of the present invention.

The decoding apparatus shall next be explained. FIG. 27 shows a schematic of the apparatus. The decoding apparatus is provided with: a prediction picture generation section 205 that generates a prediction picture; a decoded picture generation section 201 that decodes differential information and generates a decoded picture using the prediction picture; a motion vector storage memory 207 that stores motion vectors; a reference picture memory 206 that stores decoded pictures; a reference picture designation decoding section 211 that decodes reference picture designation information; a reference motion vector setting section 216 that sets a correspondence relation between the motion vector stored in the motion vector storage memory 207 and the reference picture designation information that designates the reference picture; a reference picture selection section 210 that selects a reference picture from the reference picture memory 206 using the reference picture designation information; a motion vector selection section 209 that selects one motion vector from the motion vector storage memory 207 using the reference picture designation information; a detected motion vector designation decoding section 203 that decodes detected motion vector designation information; a detected motion vector selection section 208 that selects a motion vector using the detected motion vector designation information; and a detected motion vector decoding section 202 that decodes the motion vector.

Two-frame motion vectors shall be stored in the motion vector storage memory 207 in advance. Two-frame decoded pictures shall be stored in the reference picture memory 206 in advance.

The encoded data that is encoded by the picture encoding apparatus on this basis are decoded as follows. First, the reference motion vector setting section 216 performs the association of the reference picture designation information and the motion vector. Next, a decoded picture is produced as follows for every macroblock.

The reference picture designation decoding section 211 decodes reference picture designation information. The reference picture selection section 210 selects a reference picture. The detected motion vector designation decoding section 203 decodes the detected motion vector designation information. The detected motion vector selection section 208 selects whether or not to decode the motion vector using the detected motion vector designation information. In the case of decoding the motion vector, the detected motion vector decoding section 202 decodes the motion vector. In the case of not decoding the motion vector, the motion vector selection section 209 selects a motion vector associated by the reference picture designation information from the motion vector storage memory 207. The prediction picture generation section 205 generates a prediction picture using the motion vector, and the decoded picture generation section 201 decodes the differential information and generates a decoded picture using the prediction picture.

The above processing is performed on all the macroblocks. The decoded picture generation section 201 stores the decoded picture in the reference picture memory 206. Thereby, the current frame can be decoded.

[Sixth Embodiment]

Figure 28:
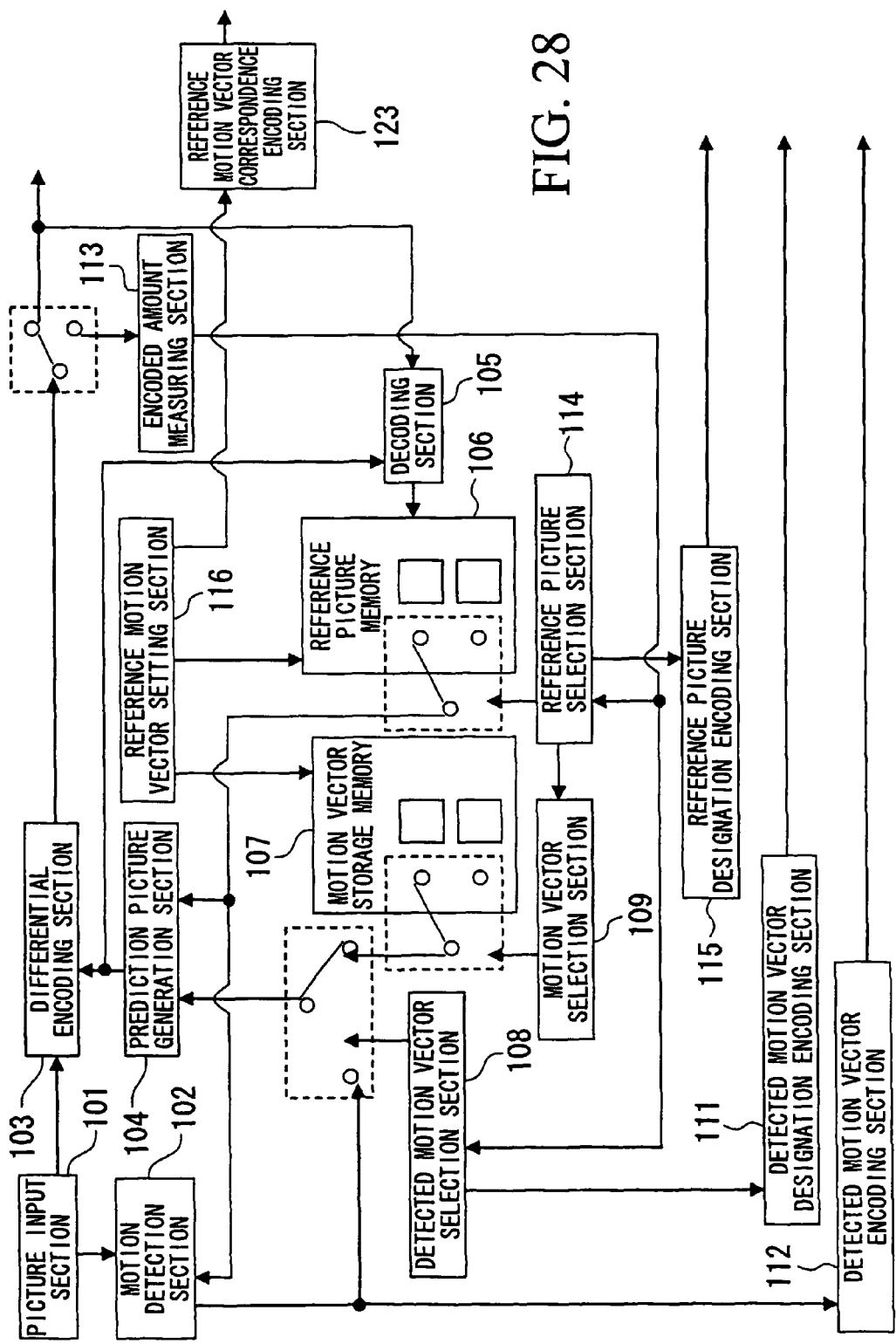
FIG. 28 is a block diagram showing the constitution of the picture encoding apparatus according to the sixth embodiment of the present invention.
Figure 29:
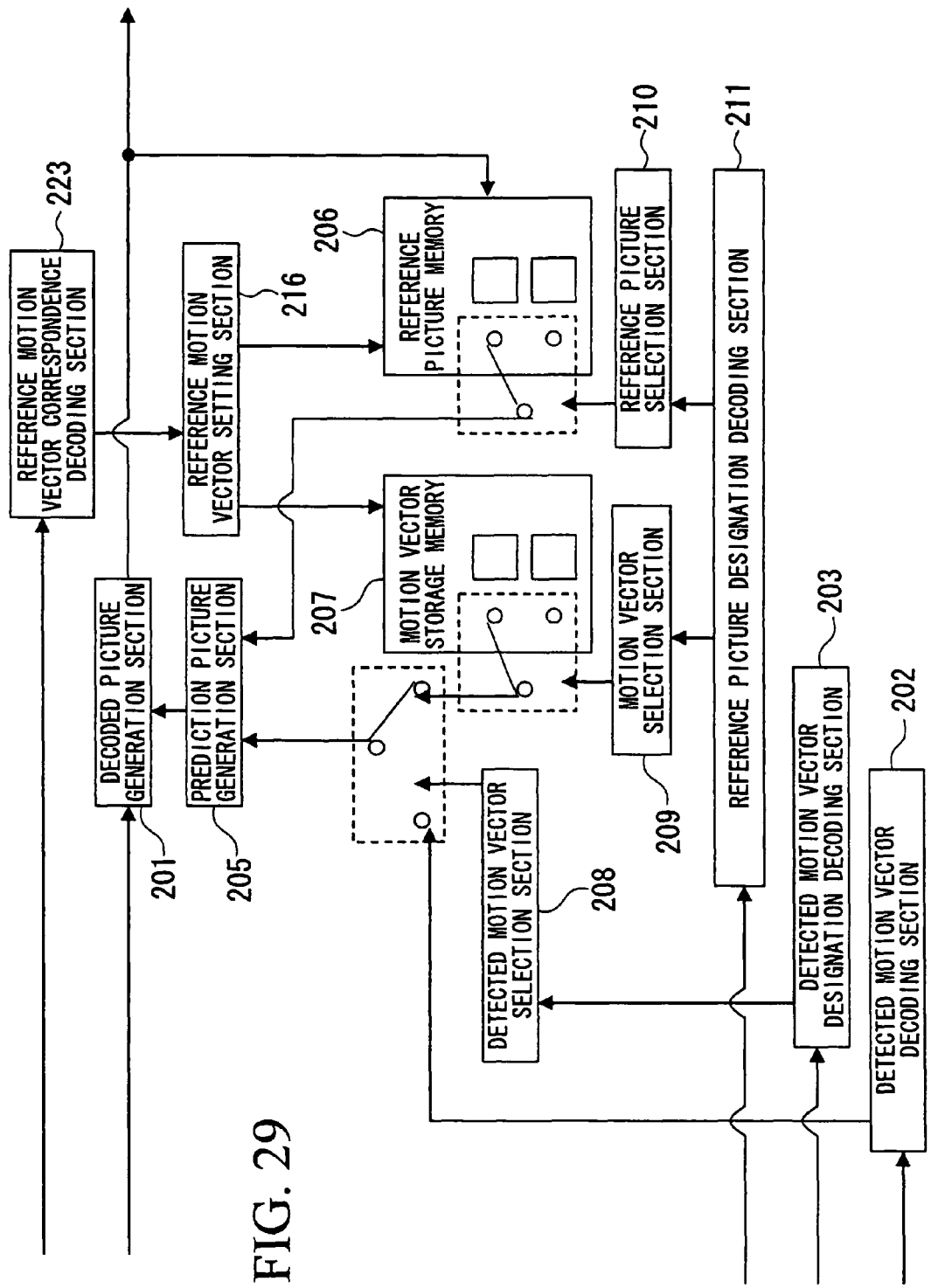
FIG. 29 is a block diagram showing the constitution of the picture decoding apparatus according to the sixth embodiment of the present invention.

In the aforementioned fifth embodiment, the association between the reference picture designation information and the motion vector was set beforehand in the reference motion vector setting sections 116 and 216, but the correspondence information may also be encoded. FIGS. 28 and 29 show schematics of the apparatus of the present embodiment based on the fifth embodiment. In this case, the picture encoding apparatus is provided with a reference motion vector correspondence encoding section 123 as shown in FIG. 28, and the picture decoding apparatus is provided with a reference motion vector correspondence decoding section 223 as shown in FIG. 29. Updating of such correspondence information may be performed in units of macroblocks, a plurality of macroblocks, or a plurality of frames.

Also, the motion vector storage memory 107 stores two-frame motion vectors. That is, a motion vector is associated with a combination of the reference picture designation information and position information within the screen of a macroblock. Motion vectors may for example be associated in units of slices rather than associating motion vectors that differ for each macroblock. For example, in the case of the screen being divided into two slices, the motion vector may be associated with a combination of the slice number and the reference picture designation information.

Also, only one correspondence of the motion vector and the reference picture designation information was set, but a plurality of correspondences may be set. In this case, information that selects the correspondence to be applied should be encoded or decoded. For example, as in the B-frame of MPEG-2, a forward prediction mode and backward prediction mode are defined for the macroblock, and the correspondence in the case of the forward prediction mode and the correspondence in the case of the backward prediction mode are set. In the forward prediction mode, the first motion vector is associated with reference picture designation information 1, and the second motion vector is associated with reference picture designation information 2. Then, in the backward prediction mode, the second motion vector is associated with the reference picture designation information 1, and the first motion vector is associated with the reference picture designation information 2. In this case, encoded mode information that designates the forward prediction mode or the backward prediction mode for each macroblock is encoded or decoded.

[Seventh Embodiment]

It is also possible to apply the present invention to temporal scalable encoding with the constitution of the embodiment shown in FIGS. 26 and 27. The decoded picture of the base layer is stored on a first reference picture memory, and a decoded picture of the enhancement layer is stored on a second reference picture memory. The frame of the base layer has the first reference picture memory serve as a reference picture, and the frame of the enhancement layer selects the reference picture from the second reference picture memory and the first reference picture memory.

With regard to the motion vector stored in the motion vector storage memory 107, similarly to the aforementioned fifth embodiment, the first reference picture designation information is associated with the first motion vector, and the second reference picture designation information is associated with the second motion vector. By doing so, when encoding or decoding the frame of the base layer, since only the first reference picture memory is used, the first motion vector is selected. Also, when selecting the reference picture from the second reference picture memory in the case of encoding or decoding the frame of the enhancement layer, the second motion vector is selected.

Moreover, when one frame is added to the motion vector storage memories 107 and 207, and the frame of the enhancement layer is encoded or decoded, in the case of selecting the reference picture from the first reference picture memory, this motion vector may be selected. Thus, when applying to temporal scalable encoding, a different motion vector can be selected for each layer. For the base layer, the frame time interval tends to be long, and for the enhancement layer the frame time interval tends to be short, and so thus being able to select different motion vectors is effective.

[Eighth Embodiment]

It is also possible to apply the present invention to multi-view encoding and stereo encoding with the constitution of the embodiment shown in FIGS. 26 and 27. In stereo encoding adopted for the MPEG-2 multi-view profile, a method similar to the aforementioned temporal scalable encoding is applied having the video of one view (view A) serve as the base layer, and the video of another view (view B) serve as the enhancement layer. In other words, the decoded picture of view A is stored in a first reference picture memory, and the decoded picture of view B is stored in a second reference picture memory. Then, the frame of view A uses the first reference picture memory as a reference picture, and the frame of view B selects a reference picture from the second reference picture memory and the first reference picture memory.

Regarding the motion vectors stored in the motion vector storage memory 107, the first reference picture designation information is associated with the first motion vector and the second reference picture designation information is associated with the second motion vector similarly to the fifth embodiment. By doing so, when encoding or decoding the frame of view A, since only the first reference picture memory is used, the first motion vector is selected. Also, when encoding or decoding the frame of view B, in the case of selecting the reference picture from the second reference picture memory, the second motion vector is selected.

Moreover, when encoding or decoding the frame of view B by adding one frame to the motion vector storage memory 107, in the case of selecting the reference picture from the first reference picture memory, this motion vector may be selected. Thus, a different motion vector can be selected for each view. This is effective for cases when the motion information differs for each view. Also, since the motion information between views (parallax information) is also stored in the motion vector storage memory 107, when the parallax does not change over time, the encoded amount of the motion vector (parallax vector) can be reduced.

Also, similarly to the aforementioned embodiments, storing the motion vector detected by the motion detection section 102 and scaling in the event of storing are effective in reducing the amount of memory of the motion vector storage memory 107. Also, the difference between the motion vector obtained by the motion detection section 102 and the motion vector stored in the motion vector storage memory 107 may be encoded.

[Ninth Embodiment]

The ninth embodiment is provided with a reference picture memory that stores one-frame decoded pictures and a motion vector storage memory that stores three-frame motion vectors, showing an example of a method of selecting a motion vector according to the positional information within a screen of the area. The present embodiment is an example of encoding a picture imaged by a camera, and shows an example of storing a motion vector obtained by measuring the amount of motion from the positional information change of the camera obtained by using a GPS (global positioning system) in the motion vector storage memory. The camera motion information obtained by using GPS and the like corresponds to the global motion amount of the entire screen. In the present embodiment, encoding is performed for each macroblock.

Figure 30:
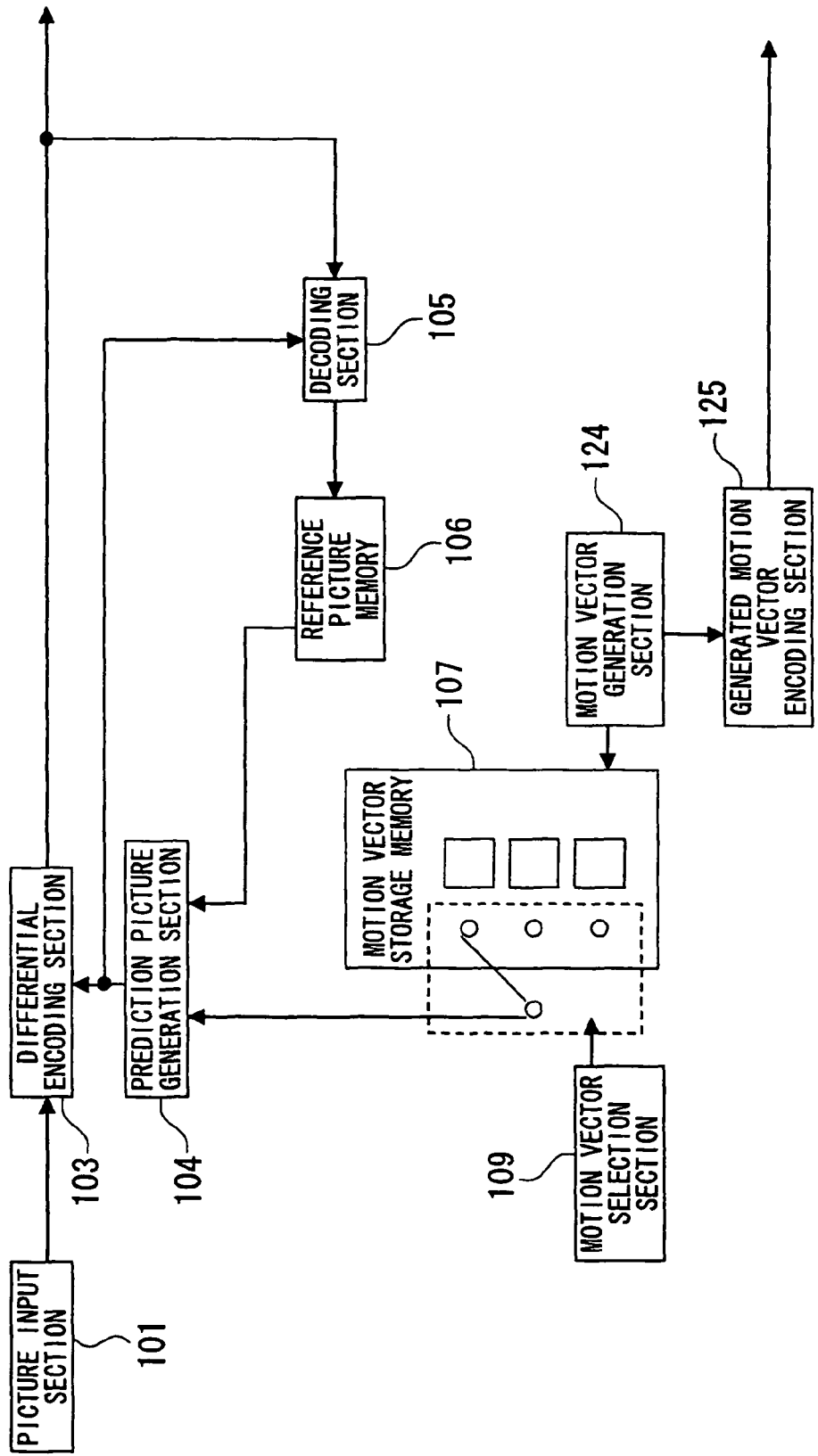
FIG. 30 is a block diagram showing the constitution of the picture encoding apparatus according to the ninth embodiment of the present invention.

First the picture encoding apparatus shall be explained. FIG. 30 shows a schematic of the apparatus. The picture encoding apparatus is provided with: a picture input section 101 that takes in picture information; a prediction picture generation section 104 that generates a prediction picture; a differential encoding section 103 that encodes a differential between the input picture information and the prediction picture; a motion vector storage memory 107 that stores motion vectors; a motion vector selection section 109 that selects one motion vector from the motion vector storage memory 107; a decoding section 105 that generates decoded pictures by decoding the differential encoded data generated by the differential encoding section 103; a reference picture memory 106 that stores decoded pictures; a motion vector generation section 124 that produces motion vectors; and a generated motion vector encoding section 125 that encodes generated motion vectors.

The motion vector generation section 124 estimates motion amounts corresponding to the upper area, the middle area, and the lower area of the screen from the positional information change of the camera, generates three motion vectors, and stores them in the motion vector storage memory 107. Here, the motion vector corresponding to the upper area of the screen is stored in the motion vector storage memory 107 as a first motion vector, the motion vector corresponding to the middle area of the screen is stored in the motion vector storage memory 107 as a second motion vector, and the motion vector corresponding to the lower area of the screen is stored in the motion vector storage memory 107 as a third motion vector. The motion vector selection section 109 selects a motion vector from the motion vector storage memory 107 in accordance with the position on the screen of the macroblock to be encoded. When in the upper portion of the screen the first motion vector is selected, when in the middle portion of the screen the second motion vector is selected, and when in the lower portion of the screen the third motion vector is selected.

The input picture is encoded as follows with this as a basis.

First, the motion vector generation section 124 generates three motion vectors and stores them in the motion vector storage memory 107. The generated motion vector encoding section 125 encodes the three motion vectors generated by the motion vector generation section 124. The picture input section 101 takes in a frame and divides it into macroblocks. Next, the following encoding is performed for every macroblock.

The motion vector selection section 109 selects a motion vector from the motion vector storage memory 107 in accordance with the position of each macroblock on the screen. The prediction picture generation section 104 generates a prediction picture using the motion vector. The differential encoding section 103 encodes the difference between the present picture and the prediction picture. The above process is performed on all the macroblocks. The decoding section 105 decodes the encoded difference, creates a decoded picture using the prediction picture, and stores the decoded picture in the reference picture memory 106.

Thereby, the present frame can be encoded.

Figure 31:
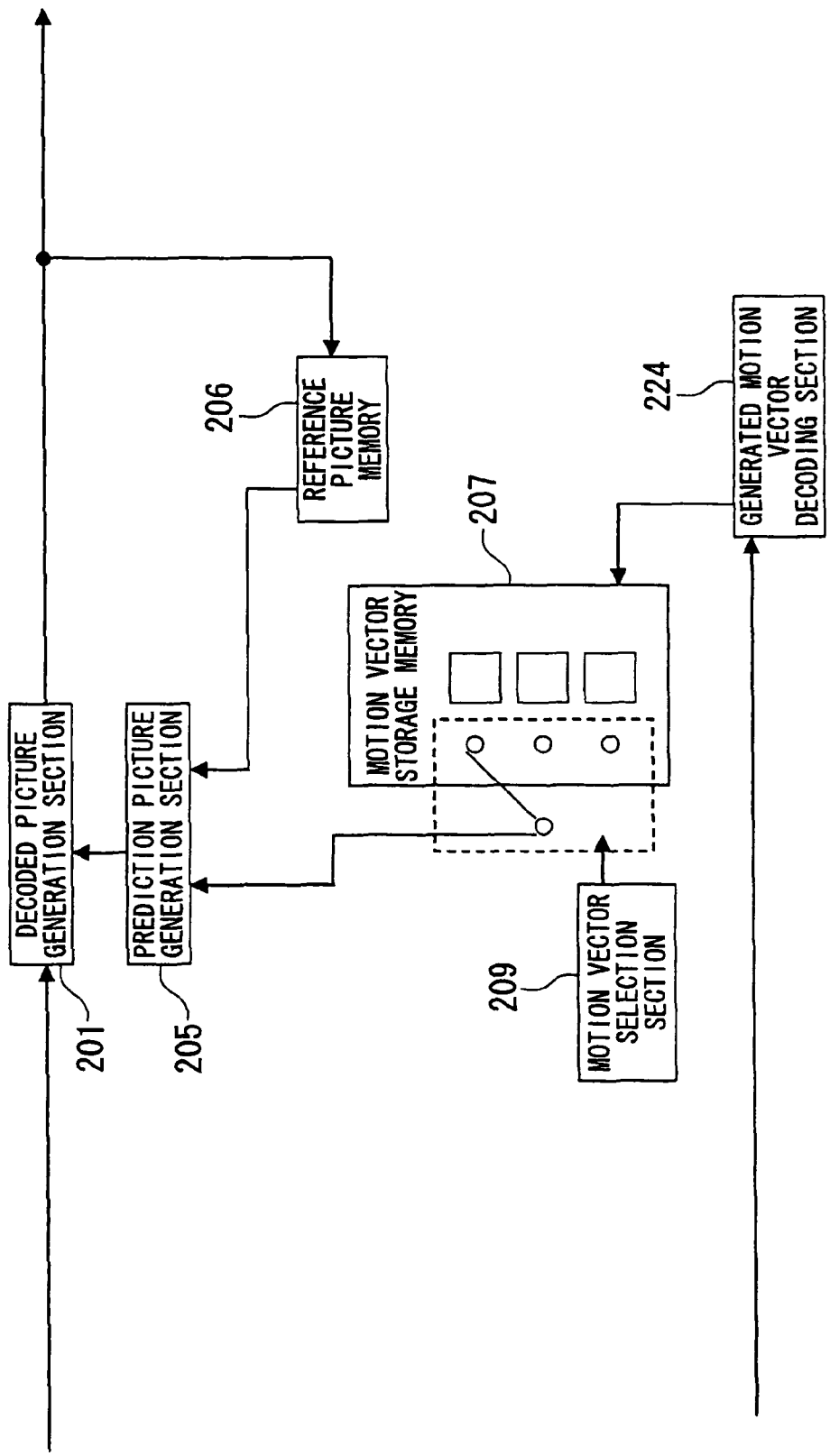
FIG. 31 is a block diagram showing the constitution of the picture decoding apparatus according to the ninth embodiment of the present invention.

The decoding apparatus shall next be explained. FIG. 31 shows a schematic of the apparatus. The picture decoding apparatus is provided with: a prediction picture generation section 205 that generates a prediction picture; a decoded picture generation section 201 that decodes differential information and generates a decoded picture using the prediction picture; a motion vector storage memory 207 that stores motion vectors; a reference picture memory 206 that stores decoded pictures; a motion vector selection section 209 that selects one motion vector from the motion vector storage memory 207; and a generated motion vector decoding section 224 that decodes generated motion vectors.

The generated motion vector decoding section 224 decodes three motion vectors and stores the obtained motion vectors in the motion vector storage memory 207.

The encoded data that is encoded by the picture encoding apparatus on this basis are decoded as follows. First, the generated motion vector decoding section 224 decodes a motion vector and then stores it in the motion vector storage memory 207.

Next, a decoded picture is produced as follows for every macroblock. The motion vector selection section 209 selects a motion vector from the motion vector storage memory 207 according to position information within the screen of the macroblock. The prediction picture generation section 205 then generates a prediction picture using the selected motion vector, and the decoded picture generation section 201 decodes the differential information and generates a decoded picture using the prediction picture.

The above processing is performed on all the macroblocks. The decoded picture generation section 201 stores the decoded picture in the reference picture memory 206.

Thereby, the current frame can be decoded.

Figure 32:
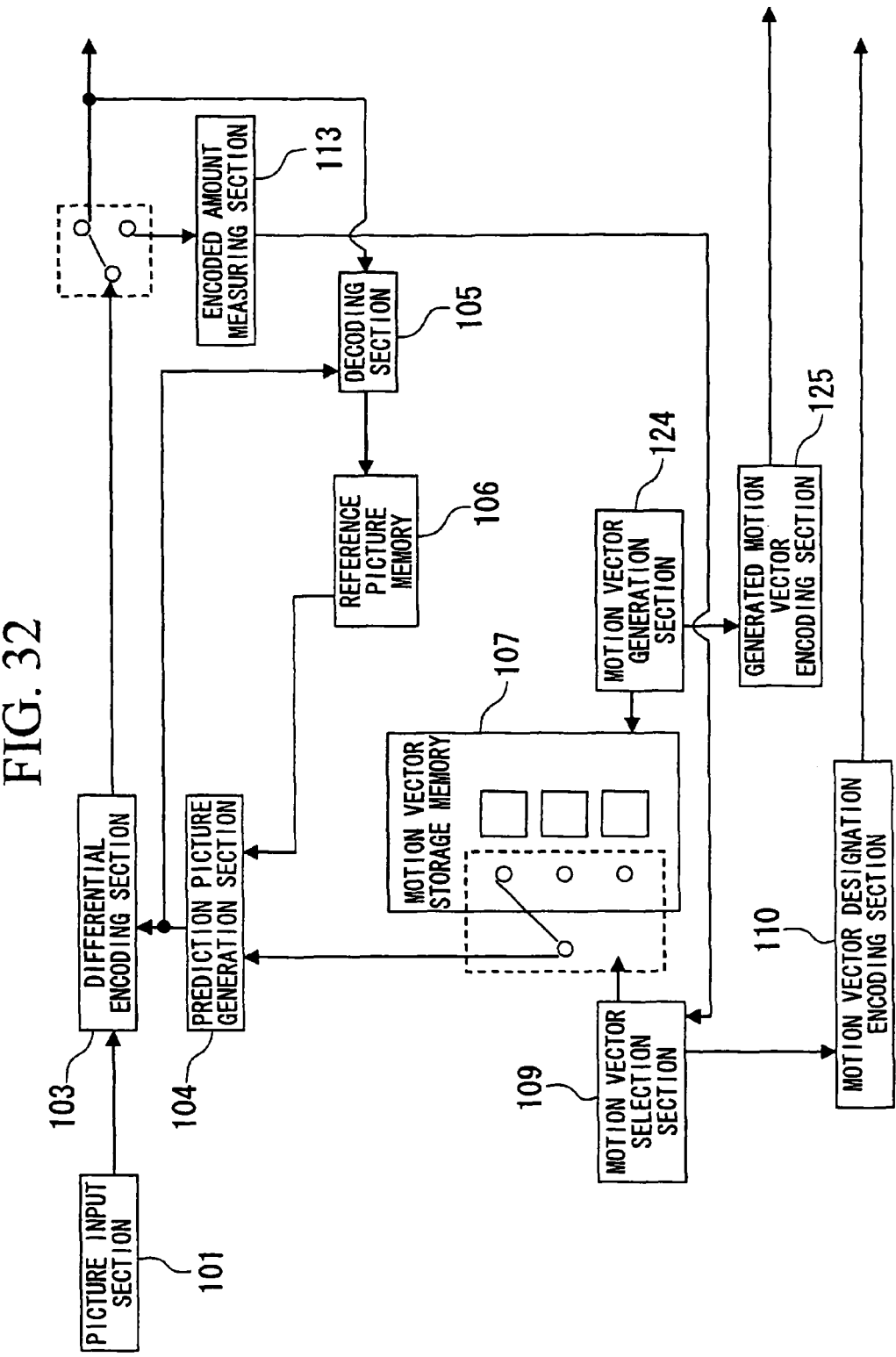
FIG. 32 is a block diagram showing the constitution of the picture encoding apparatus in the ninth embodiment of the present invention in the case of selecting the motion vector from a plurality of motion vectors so that the encoded amount is the least.
Figure 33:
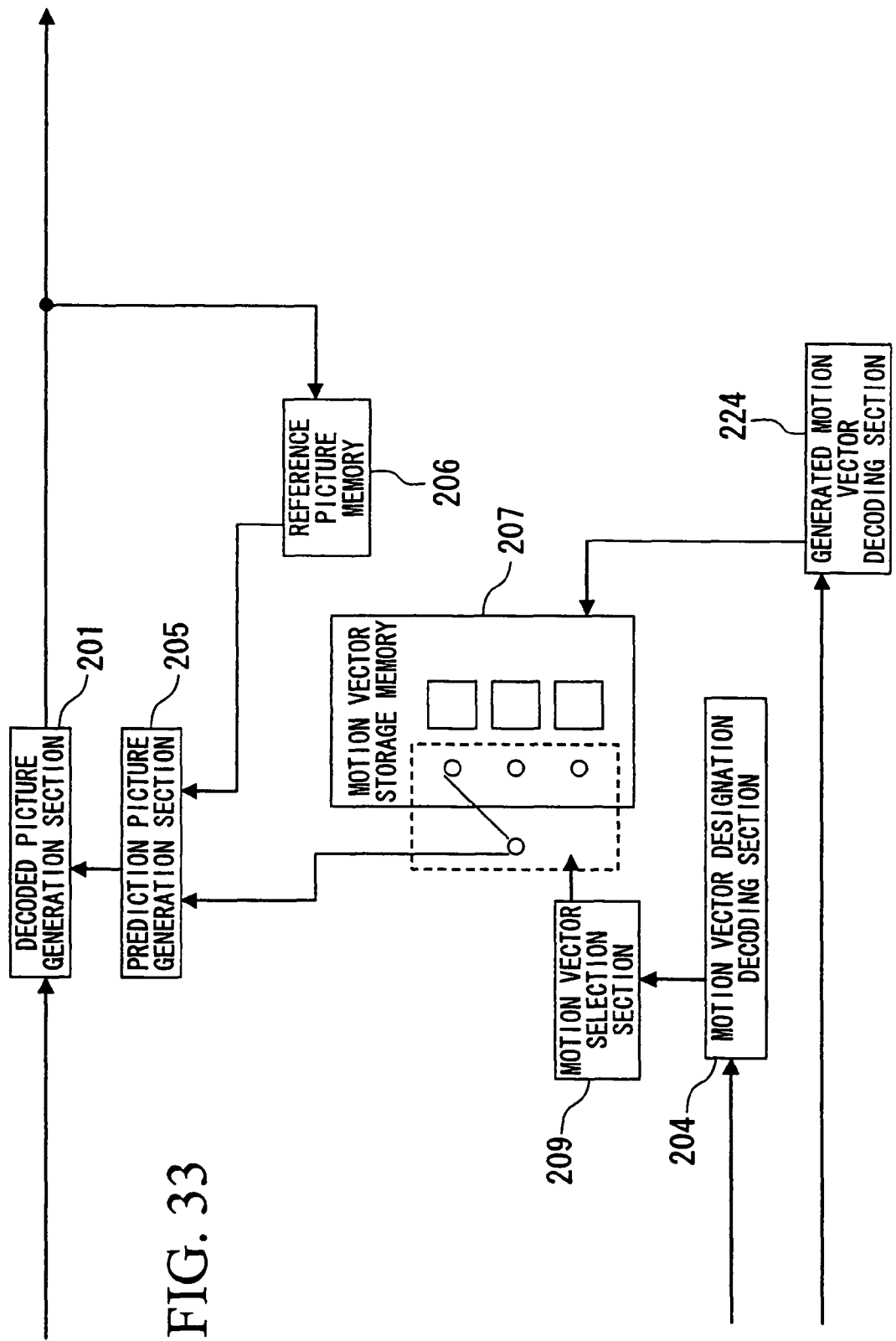
FIG. 33 is a block diagram showing the constitution of the picture decoding apparatus in the ninth embodiment of the present invention in the case of selecting the motion vector from a plurality of motion vectors so that the encoded amount is the least.

Although in the present embodiment a motion vector was selected in accordance with the macroblock position information, a motion vector may be selected from a plurality of motion vectors so that the encoded amount becomes a minimum. FIG. 32 shows the constitution of a picture encoding apparatus in this case. In addition to the constitution shown in FIG. 30, there is provided the encoded amount measuring section 113 that measures the encoded amount and the motion vector designation encoding section 110 that encodes information that designates the motion vector. In this constitution, the encoded amount is measured for the three motion vectors stored in the motion vector storage memory 107 for each macroblock, and the information designating the motion vector in the case of the encoded amount being the least is encoded by the motion vector designation encoding section 110. Also, FIG. 33 shows the constitution of the picture decoding apparatus. In addition to the constitution shown in FIG. 31, there is provided a motion vector designation decoding section 204 that decodes information designating a motion vector. By decoding information that designates a motion vector with the motion vector designation decoding section 204, a motion vector can be selected for every macroblock.

[Tenth Embodiment]

The tenth embodiment is provided with a reference picture memory that stores two-frame decoded pictures and a motion vector storage memory that stores two-frame motion vectors, showing an example of a method of designating a motion vector simultaneously as the reference picture with the reference picture designation information. The present embodiment is an example of encoding a picture imaged by a camera, and shows an example of storing a motion vector obtained by measuring the amount of motion of each frame stored in the reference picture memory and the current frame from the positional information change of a camera obtained by using a GPS, etc., in a motion vector storage memory. The camera motion information obtained by using GPS and the like corresponds to the global motion amount of the entire screen. In the present embodiment, encoding is performed for each macroblock.

Figure 34:
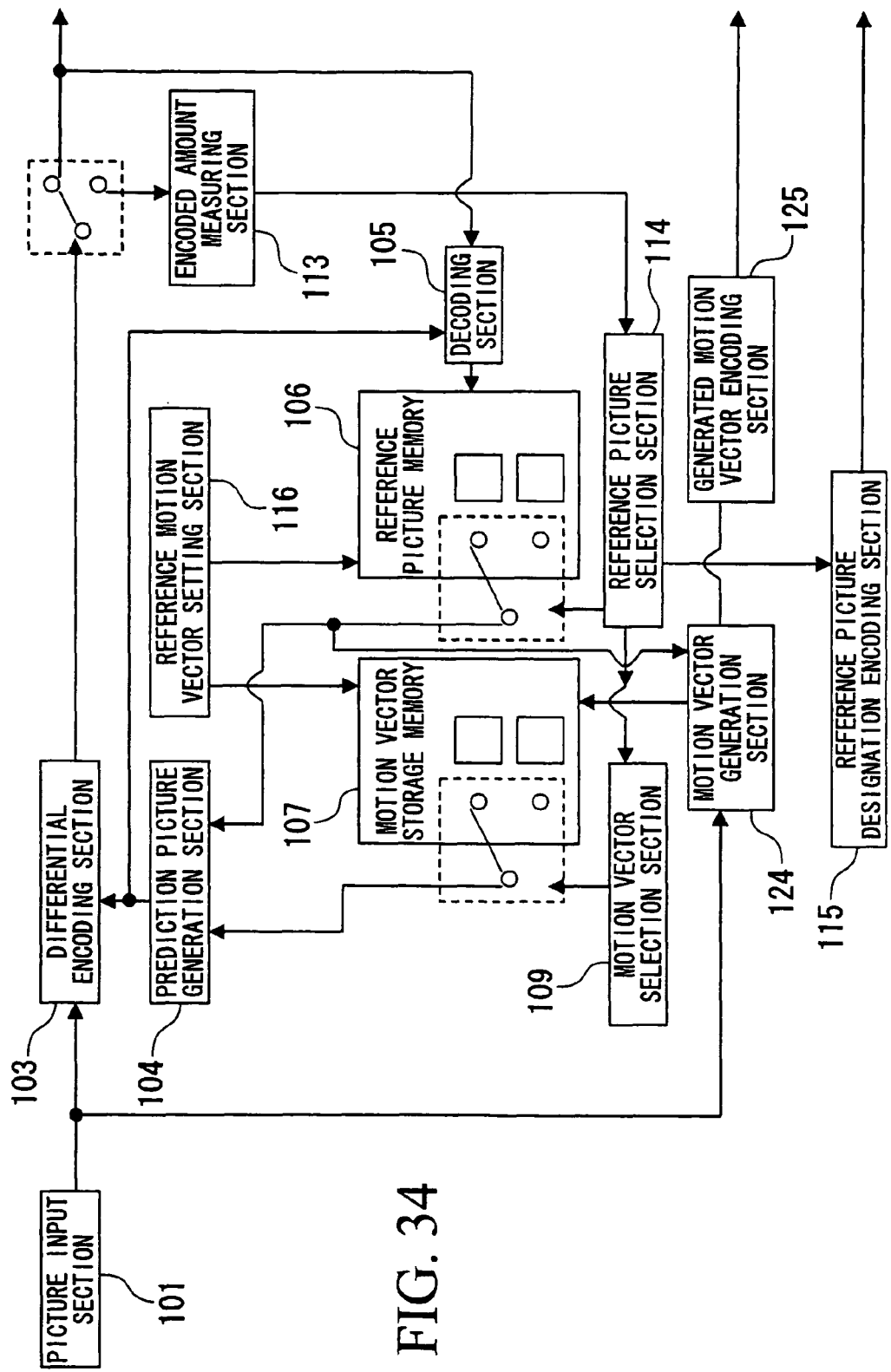
FIG. 34 is a block diagram showing the constitution of the picture encoding apparatus according to the tenth embodiment of the present invention.

First the picture encoding apparatus shall be explained. FIG. 34 shows a schematic of the apparatus. The picture encoding apparatus is provided with: a picture input section 101 that takes in picture information; a prediction picture generation section 104 that generates a prediction picture; a differential encoding section 103 that encodes a differential between the input picture information and the prediction picture; a motion vector storage memory 107 that stores motion vectors; a motion vector selection section 109 that selects one motion vector from the motion vector storage memory 107; a reference picture memory 106 that stores decoded pictures; a reference picture selection section 114 that selects a reference picture; a reference picture designation encoding section 115 that encodes reference picture designation information; a reference motion vector setting section 116 that sets the correspondence relation between the motion vector stored in the motion vector storage memory 107 and the reference picture designation information that designates a reference picture; a decoding section 105 that generates decoded pictures by decoding the differential encoded data produced by the differential encoding section 103; a motion vector generation section 124 that produces motion vectors; a generated motion vector encoding section 125 that encodes generated motion vectors; and an encoded amount measuring section 113 that measures the encoded amount.

The motion vector generation section 124 generates a motion vector between each frame stored in the reference picture memory 106 and the current frame from the positional information change of the camera, and stores it in the motion vector storage memory 107. In the reference motion vector setting section 116, a first motion vector is associated with the first reference picture, and a second motion vector is associated with the second reference picture. After encoding one frame, the picture of the first reference picture is stored in the reference picture memory 106 as the second reference picture, and the decoded picture is stored in the reference picture memory 106 as the first reference picture.

The input picture is encoded as follows with this as a basis.

First, the reference motion vector setting section 116 performs the association of the reference picture designation information and the motion vector. The picture input section 101 divides the input picture into macroblocks. The motion vector generation section 124 generates two motion vectors for the input picture and stores them in the motion vector storage memory 107. The generated motion vector encoding section 125 encodes the two motion vectors generated by the motion vector generation section 124. Next, the following encoding is performed for every macroblock.

The reference picture selection section 114 selects the first reference picture. The motion vector selection section 109 selects a motion vector from the motion vector storage memory 107 in accordance with the reference picture designation information associated by the reference motion vector setting section 116. The prediction picture generation section 104 generates a prediction picture using the motion vector. The differential encoding section 103 encodes the difference between the present picture and the prediction picture. The encoded amount measuring section 113 measures the encoded amount.

Next, the reference picture selection section 114 selects the second reference picture. The motion vector selection section 109 selects a motion vector from the motion vector storage memory 107 in accordance with the reference picture designation information associated by the reference motion-vector setting section 116. The prediction picture generation section 104 generates a prediction picture using the selected motion vector. The differential encoding section 103 encodes the difference between the present picture and the prediction picture. The encoded amount measuring section 113 measures the encoded amount.

Then the reference picture selection section 114 selects the picture of lower encoded amount obtained by the encoded amount measuring section 113 as the reference picture to be used for encoding of the present frame. The motion vector selection section 109 selects from the motion vector storage memory 107 the motion vector associated with the reference picture used in the encoding of the present frame in accordance with the reference picture designation information associated by the reference motion vector setting section 116. The prediction picture generation section 104 generates a prediction picture using the motion vector. The differential encoding section 103 encodes the difference between the present picture and the prediction picture.

The above processing is performed on all the macroblocks. The decoding section 105 decodes the encoded difference, creates a decoded picture using the prediction picture, and stores the decoded picture in the reference picture memory 106 as the first reference picture.

Thereby, the present frame can be encoded.

Figure 35:
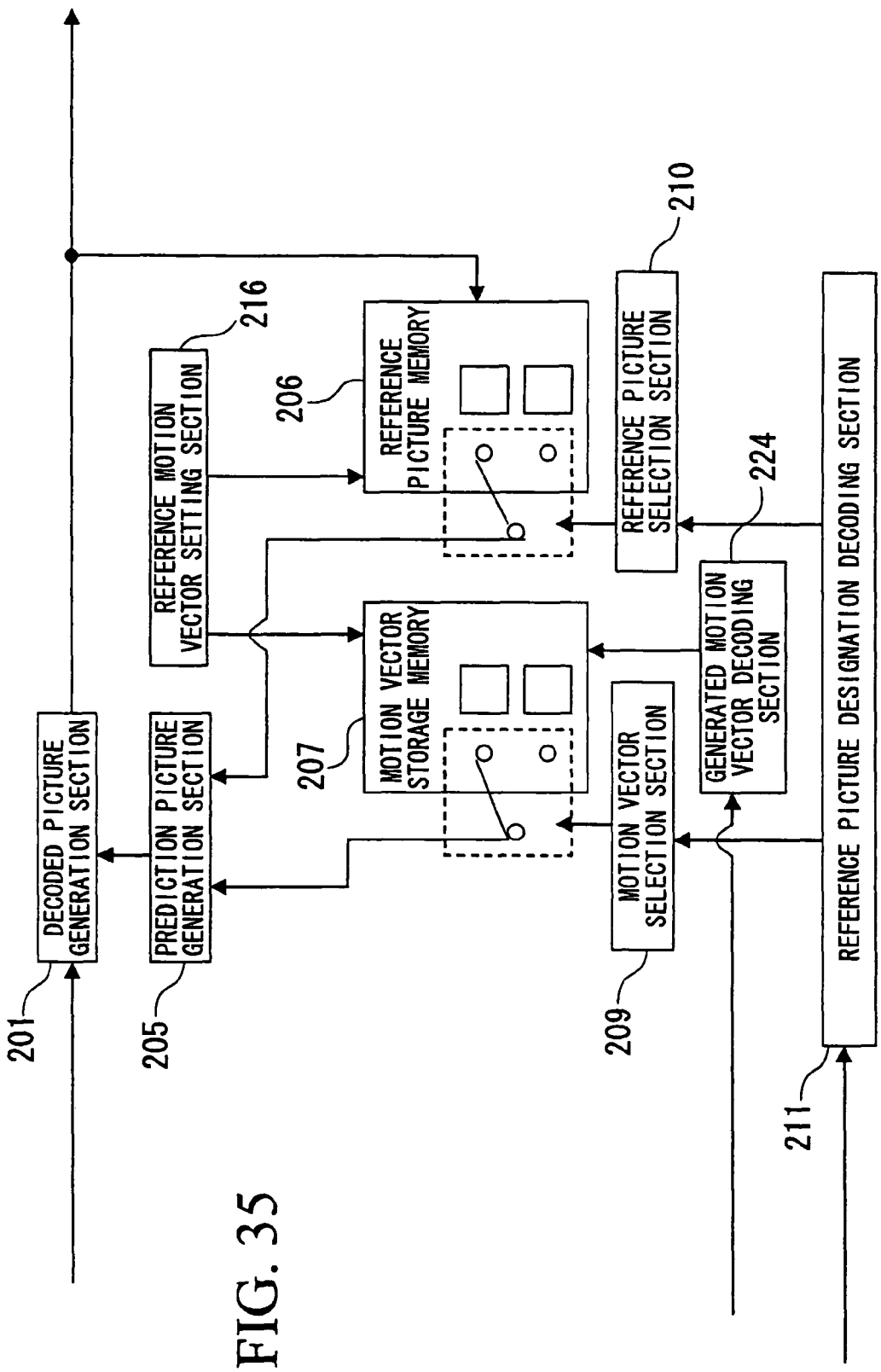
FIG. 35 is a block diagram showing the constitution of the picture decoding apparatus according to the tenth embodiment of the present invention.

The decoding apparatus shall next be explained. FIG. 35 shows a schematic of the apparatus. The picture decoding apparatus is provided with: a prediction picture generation section 205 that generates a prediction picture; a decoded picture generation section 201 that decodes differential information and generates a decoded picture using the prediction picture; a motion vector storage memory 207 that stores motion vectors; a reference picture memory 206 that stores decoded pictures; a reference picture designation decoding section 211 that decodes reference picture designation information; a reference motion vector setting section 216 that sets a correspondence relation between the motion vector stored in the motion vector storage memory 207 and the reference picture designation information that designates the reference picture; a reference picture selection section 210 that selects a reference picture from the reference picture memory 206 using the reference picture designation information; a motion vector selection section 209 that selects one motion vector from the motion vector storage memory 207 using the reference picture designation information; and a generated motion vector decoding section 224 that decodes generated motion vectors.

Two-frame decoded pictures shall be stored in the reference picture memory 206 in advance.

The encoded data that is encoded by the picture encoding apparatus on this basis are decoded as follows. First, the reference motion vector setting section 216 associates the motion vector with the reference picture designation information. The generated motion vector decoding section 224 decodes the motion vector and stores it in the motion vector storage memory 207.

Next, a decoded picture is produced as follows for every macroblock. The reference picture designation decoding section 211 decodes reference picture designation information. The reference picture selection section 210 selects a reference picture in accordance with the decoded reference picture designation information. The motion vector selection section 209 selects a motion vector associated by the reference picture designation information from the motion vector storage memory 207. The prediction picture generation section 205 then generates a prediction picture using the selected motion vector, and the decoded picture generation section 201 decodes the differential information and generates a decoded picture using the prediction picture.

The above process is performed for every macroblock. The decoded picture generation section 201 stores the decoded picture in the reference picture memory 206 as the first reference picture.

Thereby, the current frame can be decoded.

In the above embodiments, lossy encoding of the differential data was performed, but lossless encoding may be performed. In this case, the decoding section 105 is not provided in the picture encoding apparatus so that an original picture, and not a decoded picture, may be stored in the reference picture memory 106.

The process of picture encoding and decoding explained above can be realized by a computer and software program. It is possible to provide the program on a computer-readable recording medium and also to provide it over a network.

Also, the explanation in the above embodiments centered on the picture encoding apparatus and the picture decoding apparatus, but it is possible to realize a picture encoding method and a picture decoding method of the present invention by steps corresponding to the operation of the respective sections of the picture encoding apparatus and the picture decoding apparatus.

While preferred embodiments of the invention have been described above with reference to the appended drawings, it should be understood that these are exemplary of the invention and are not to be considered as limiting. Accordingly, additions, omissions, and substitutions of constituent elements, and other modifications can be made without departing from the spirit or scope of the present invention. For example, the constituent elements of the embodiments may be suitably combined.

INDUSTRIAL APPLICABILITY

The present invention is applied to multi-frame picture encoding using an inter-frame prediction encoding scheme. In the present invention, since a prediction picture is generated by selecting a motion vector to be used from a plurality of motion vectors stored in advance, the motion vector can be selected from motion vector candidates, which can improve the encoding efficiency. Also, even when there is no continuity of motion between successive frames, since the motion vector can be selected from a plurality of motion vector candidates, an efficient motion vector can be selected.

The invention claimed is:

1. A picture encoding method that encodes picture information for each area by selecting a reference picture from picture information of a plurality of frames that have been previously encoded and generating a prediction picture, the method comprising:
   a reference motion vector setting step that sets a correspondence relation between a plurality of motion vectors that have been stored in advance and reference picture designation information that designates a reference picture and a motion vector using layer information on a layer to which a frame to be encoded belongs among layers that are provided for temporal scalable encoding, multi-view encoding, or stereo encoding, a motion vector corresponding to a reference picture of a layer that is different from a predetermined layer being includable in motion vectors stored for the predetermined layer;
   a reference picture selection step that selects the reference picture;
   a reference picture designation encoding step that encodes the reference picture designation information that designates the reference picture instead of independently encoding reference picture information and a motion vector;
   a motion vector selection step that selects a motion vector corresponding to the reference picture designation information that designates the selected reference picture from the plurality of motion vectors that have been stored in advance;
   a prediction picture generation step that generates a prediction picture from the reference picture using the motion vector selected by the motion vector selection step; and
   a differential encoding step that encodes a difference between the picture information of the present area and the prediction picture.

2. The picture encoding method as recited in claim 1, further comprising:
   a motion detection step that detects a motion vector using the picture information of the present area and the reference picture;
   a detected motion vector selection step that selects either of the motion vector selected by the motion vector selection step or the motion vector obtained in the motion detection step;
   a detected motion vector encoding step that, when the motion vector obtained in the motion detection step is selected by the detected motion vector selection step, encodes the motion vector; and
   a detected motion vector designation encoding step that encodes information designating the motion vector selected by the detected motion vector selection step.

3. The picture encoding method as recited in claim 1, further comprising:
   a motion detection step that detects a motion vector using the picture information of the present area and the reference picture; and
   a differential motion vector encoding step that encodes the difference between the motion vector selected by the motion vector selection step and the motion vector obtained in the motion detection step.

4. The picture encoding method as recited in claim 3, further comprising:
   a motion vector storage step that stores motion vectors;
   a motion vector storage decision step that decides whether or not to store a motion vector; and
   a motion vector storage designation encoding step that encodes information that designates whether or not to store a motion vector.

5. The picture encoding method as recited in claim 3, further comprising:
   a motion vector storage step that stores motion vectors; and
   a motion vector scaling step that changes the value of the motion vector using motion vector scaling information.

6. The picture encoding method as recited in claim 5, further comprising a scaling encoding step that encodes the motion vector scaling information.

7. A picture decoding method that decodes picture information for each area by selecting a reference picture from picture information of a plurality of frames that have been previously decoded and generating a prediction picture, the method comprising:
   a reference motion vector setting step that sets a correspondence relation between a plurality of motion vectors that have been stored in advance and reference picture designation information that designates a reference picture and a motion vector using layer information on a layer to which a frame to be decoded belongs among layers that are provided for temporal scalable encoding, multi-view encoding, or stereo encoding, a motion vector corresponding to a reference picture of a layer that is different from a predetermined layer being includable in motion vectors stored for the predetermined layer;
   a reference picture designation decoding step that decodes the reference picture designation information that designates the reference picture instead of independently decoding reference picture information and a motion vector;
   a reference picture selection step that selects the reference picture;
   a motion vector selection step that selects a motion vector corresponding to the reference picture designation information that designates the selected reference picture from the plurality of motion vectors that have been stored in advance;
   a prediction picture generation step that generates a prediction picture from the reference picture using the motion vector selected by the motion vector selection step; and
   a decoded picture generation step that generates a decoded picture by decoding a difference between the picture information of the present area and the prediction picture.

8. The picture decoding method as recited in claim 7, further comprising:

a detected motion vector designation decoding step that decodes information that designates whether or not the motion vector is encoded; and a detected motion vector decoding step that decodes the motion vector in the case that the motion vector is encoded.

9. The picture decoding method as recited in claim 7, further comprising:

a differential motion vector decoding step that decodes a differential motion vector; and a differential motion vector computation step that computes the motion vector from the differential motion vector and the motion vector selected by the motion vector selection step.

10. The picture decoding method as recited in claim 9, further comprising:

a motion vector storage step that stores motion vectors; and a motion vector storage designation decoding step that decodes information that designates whether or not to store a motion vector.

11. The picture decoding method as recited in claim 9, further comprising:

a motion vector storage step that stores motion vectors; and a motion vector scaling step that changes the value of the motion vector using motion vector scaling information.

12. The picture decoding method as recited in claim 11, further comprising a scaling decoding step that decodes the motion vector scaling information.

\* \* \* \* \*